(12) United States Patent
Santos Rubio et al.

(10) Patent No.: US 7,677,497 B2
(45) Date of Patent: Mar. 16, 2010

(54) HATCH-ACTUATING MECHANISM, PARTICULARLY FOR AN AIRCRAFT LANDING GEAR

(75) Inventors: Lara Santos Rubio, Madrid (ES); José Luis Chicharro González, Madrid (ES)

(73) Assignee: Airbus Espana S.L., Madrid (ES)

( * ) Notice: Subject to any disclaimer, the term of this patent is extended or adjusted under 35 U.S.C. 154(b) by 660 days.

(21) Appl. No.: 11/169,842

(22) Filed: Jun. 29, 2005

(65) Prior Publication Data

US 2006/0157621 A1  Jul. 20, 2006

(30) Foreign Application Priority Data

Dec. 31, 2004  (ES) ................................ 200403173

(51) Int. Cl.
*B64C 1/14*  (2006.01)
(52) U.S. Cl. ................................ 244/129.5; 244/129.4
(58) Field of Classification Search .............. 244/129.1, 244/129.4, 129.5, 100 R, 102 R; 49/339, 49/340, 344
See application file for complete search history.

(56) References Cited

U.S. PATENT DOCUMENTS

| | | | | |
|---|---|---|---|---|
| 3,088,694 A | * | 5/1963 | Stirgwolt et al. ............ 244/12.3 |
| 3,174,712 A | * | 3/1965 | Ricard ...................... 244/129.5 |
| 3,196,932 A | * | 7/1965 | Rosendahl .................. 160/188 |
| 3,430,675 A | * | 3/1969 | Nordh ........................ 160/188 |
| 3,467,164 A | * | 9/1969 | Olsson ........................ 160/188 |
| 3,718,171 A | * | 2/1973 | Godwin ....................... 160/210 |
| 4,568,045 A | * | 2/1986 | Mayer ...................... 244/102 R |
| 5,335,880 A | * | 8/1994 | Klug ........................ 244/118.3 |
| 5,716,030 A | * | 2/1998 | LaFiandra et al. ......... 244/158.1 |
| 5,803,405 A | * | 9/1998 | Ellis et al. .................... 244/130 |
| 5,947,417 A | * | 9/1999 | Cameron ................. 244/129.5 |
| 5,975,463 A | * | 11/1999 | Gruensfelder et al. .... 244/118.1 |
| 6,068,215 A | * | 5/2000 | Gruensfelder et al. .... 244/129.5 |
| 6,345,786 B1 | * | 2/2002 | Sakurai ................... 244/102 R |
| 6,352,221 B1 | * | 3/2002 | Sakurai ................... 244/102 R |
| 6,536,711 B1 | * | 3/2003 | Conway et al. ........... 244/129.5 |
| 6,666,408 B1 | * | 12/2003 | De Carvalho et al. .... 244/129.4 |
| 7,178,759 B2 | * | 2/2007 | Rouyre .................... 244/129.5 |

FOREIGN PATENT DOCUMENTS

| | | |
|---|---|---|
| EP | 199220 A1 | 10/1986 |
| EP | 1129938 A1 * | 9/2001 |
| WO | WO 2004/000502 A1 | 12/2003 |
| WO | WO 2008041023 A1 * | 4/2008 |

\* cited by examiner

*Primary Examiner*—Michael R Mansen
*Assistant Examiner*—Joseph W Sanderson
(74) *Attorney, Agent, or Firm*—Klauber & Jackson L.L.C.

(57) ABSTRACT

A hatch-actuating mechanism, particularly for aircraft landing gear. The mechanism includes a lateral closing panel (1) and a secondary closing panel (4) articulated to one another. A lateral pivoting fitting (5) is joined to the lateral panel (1) and pivots about a fixed point on the structure (7). A secondary pivoting fitting (8) is joined to the secondary panel (4). A lateral actuating cylinder (10) controls the movement of the lateral panel. An intermediate actuating cylinder controls the movement of the secondary panel, the intermediate actuating cylinder (13) being actuatable independently from the lateral actuating cylinder (10).

7 Claims, 20 Drawing Sheets

HATCH-ACTUATING MECHANISM, PARTICULARLY FOR AN AIRCRAFT LANDING GEAR

RELATED APPLICATIONS

The present application claims priority from Spanish Patent Application Serial No. P200403173 filed on Dec. 31, 2004. Applicant claims priority under 35 U.S.C. §119 as to said Spanish application, and the entire disclosure of that application is incorporated herein by reference.

TECHNICAL FIELD OF THE INVENTION

The present invention pertains to the technical field of hatch mechanisms, being particularly suitable for aircraft landing gear hatches, particularly for a central aircraft hatch.

STATE OF THE ART PRIOR TO THE INVENTION

In many hatch and hatch-actuating mechanism applications, there are restrictions limiting the existing space for the opening of the closing panels. Thus, when hatches having one single pivoting axis are used, there must be a free space inside the pivoting space defined by the pivoting of the edge of the hatch. In the case of aircraft landing gear hatches, this space is even more pronounced in view of the fact that, on one hand, the interior space for the hatch to fold up is limited and, on the other, there is a clear limitation of the width of the hatch panel in relation to the length of the landing gear leg. This latter problem involves the fact that when the cover is in the open position, such as when an aircraft is in the process of landing, the cover must not be wider than the length of the leg, given that the free edge of the cover would otherwise drag on the ground during the take-off and landing maneuvers. In addition thereto, one larger width of the hatch panels involves beating on too large a surface area being exposed to the air currents which attack the aerodynamic contour.

To reduce the amount of space required for the envelope necessary for opening aircraft landing gear hatch panels, technical solutions have been developed for reducing or modifying the envelope, such as pantograph type joints. However, due to this type of joints requiring attachment to fixed parts, movement is therefore limited, in addition to these pantograph type joints are complex in structure and provide barely flexible kinematics.

In addition to the aforementioned space requirements, the landing gear hatches in modern aircraft need to be closed once the landing gear has been extended. To make this configuration possible, it is necessary to leave an open space after closing the hatch through which the landing gear leg will be able to pass when the hatch is closed. The conventional solution is to design an auxiliary hatch mechanically joined to the landing gear (pant hatch). The wider the closing panel of this auxiliary hatch, the more complex its actuating mechanism and the greater its negative impact on the aerodynamic contour.

DESCRIPTION OF THE INVENTION

The present invention refers to a hatch-actuating mechanism, particularly for an aircraft landing gear, comprising at least one outboard lateral closing panel dimensioned to cover, in hatch-closed position, a first lateral area of an opening for accessing an inboard space, leaving a first strip neighboring the first lateral area free; at least one secondary outboard closing panel dimensioned to cover, in hatch-closed position, at least part of the first strip which is not covered by the lateral panel; at least one lateral pivoting fitting to which the lateral panel is joined at the bottom, couplable by lateral means of articulation to a first fixed structure which is positioned laterally in the inboard space; at least one secondary pivoting fitting to which the secondary panel is joined at the bottom; intermediate means of articulation which couple the lateral pivoting fitting to the secondary pivoting fitting; at least one lateral actuating cylinder, hydraulic or pneumatic, couplable at its first end portion to a first point of lateral articulation on the first fixed structure and coupled at its second end portion to an intermediate point of intermediate articulation to the lateral pivoting fitting, the intermediate point of articulation being arranged in a position between the lateral means of articulation and the intermediate means of articulation such that the actuation of the lateral actuating cylinder tilts the lateral pivoting fitting with the lateral panel between a closed position in which the lateral panel covers the first lateral area, and an open position in which the lateral panel does not cover the first lateral area, said mechanism also comprises at least one intermediate actuating cylinder, hydraulic or pneumatic, coupled at its first end portion to a first coupling point located in a position between the lateral means of articulation and the intermediate means of articulation on the first lateral pivoting fitting, and a second end part coupled to a second coupling point on the secondary pivoting fitting, such that the intermediate actuating cylinder is actuatable independently from the lateral actuating cylinder, so that its actuation makes it possible to tilt the secondary pivoting fitting with the secondary panel from a folded position in which they are tilted toward the lateral pivoting fitting and the secondary panel does not cover the first strip, and a unfolded position in which they are tilted in the direction opposite to the lateral pivoting fitting, such that, when the lateral panel is in the closed position, the secondary panel forms an outer surface in conjunction with the lateral panel and covers the first strip at least partially.

In a first special embodiment of the mechanism of the present invention, particularly suitable for medium-sized landing gear hatches, the mechanism also comprises an additional exterior lateral closing panel dimensioned to cover, in hatch closed position, a second lateral area of the access opening, opposite the first lateral area and neighboring the first strip, and at least one additional lateral pivoting fitting to which the additional lateral panel is attached at the bottom, couplable by way of additional lateral means of articulation to a second fixed structure which is located laterally in the inboard space in a position crosswise opposite the position of the first fixed structure. In this embodiment, there is at least one additional lateral actuating cylinder, hydraulic or pneumatic, couplable by its first end part to a first additional lateral articulation point on the second fixed structure, and coupled by its second end part to an additional intermediate articulation point of the additional lateral pivoting fitting. The additional intermediate articulation point is located in a position between the additional lateral means of articulation and the additional intermediate means of articulation such that the actuation of the additional lateral actuating cylinder tilts the additional lateral pivoting fitting with the additional lateral panel from a closed position in which the additional lateral panel covers the second lateral area, to an open position in which the additional lateral panel does not cover the second lateral area.

In a second particular embodiment of the invention, applicable especially to medium and large-sized landing gear hatches, the mechanism also comprises an additional exterior lateral closing panel dimensioned to cover, in hatch-closed position, a second lateral area of the access opening, opposite the first lateral area, leaving a second strip free between the first strip and the second lateral area, and an additional exterior secondary closing panel dimensioned to cover, in the hatch-closed position, at least part of the second strip which is not covered by any other of the panels. In addition thereto, the mechanism also comprises at least one lateral pivoting fitting to which the additional lateral panel is joined at the bottom, couplable by additional lateral means of articulation to a second fixed structure which is positioned laterally in the inboard space, in a position crosswise opposite the position of the first fixed structure and at least one additional secondary pivoting fitting to which the additional secondary panel is joined at the bottom, as well as additional intermediate means of articulation which couple the additional lateral pivoting fitting to the additional secondary pivoting fitting, and at least one additional lateral actuating cylinder, hydraulic or pneumatic, couplable by its first end part to a first additional lateral articulation point on the second fixed structure, and coupled by its second end part to an additional intermediate articulation point of the additional lateral pivoting fitting. In this second embodiment, the additional intermediate articulation point is located in a position between the additional lateral means of articulation and said additional intermediate means of articulation such that the actuation of said additional lateral actuating cylinder tilts said additional lateral pivoting fitting with the additional lateral panel from a closed position in which the additional lateral panel covers the second lateral area, and an open position in which said additional lateral panel does not cover the second lateral area. In this second embodiment, provision is also made for at least one additional intermediate actuating cylinder, hydraulic or pneumatic, with a first end part coupled to a first additional coupling point arranged in a position between said additional lateral means of articulation and the additional intermediate means of articulation on the first additional lateral pivoting fitting, and a second end part coupled to a second additional coupling point on the additional secondary pivoting fitting. The additional intermediate actuating cylinder is also actuatable independently from the additional lateral actuating cylinder, such that the actuation thereof makes it possible to tilt the additional secondary pivoting fitting with the additional secondary panel from a folded position in which they are tilted toward the additional lateral fitting and the additional secondary panel does not cover the second strip, and a unfolded position in which they are tilted in the opposite direction of the additional lateral pivoting fitting, while the additional secondary panel forms, when the additional lateral panel is in the closed position, a joint outer surface with the additional lateral panel and covers the second strip at least partially. Likewise, in closed position, the lateral panels and the secondary panels form a cover which covers the access opening at least partially.

In the embodiments described hereinabove, each lateral actuating cylinder is articulated to its corresponding fixed structure at a first pivoting point which is located on a first horizontal plane, and to its corresponding lateral fitting on a second pivoting point which is situated on a second horizontal plane. In turn, each lateral fitting is articulated to its corresponding fixed structure on a third pivoting point which is located on a third horizontal plane. Likewise, each intermediate actuating cylinder is preferably articulated to its corresponding lateral fitting at a fourth point which is located on a fourth horizontal plane and to its corresponding secondary fitting at a fifth pivoting point which is located on a fifth horizontal plane, whilst each secondary fitting is articulated to its corresponding lateral fitting on a sixth pivoting point which is located on a sixth horizontal plane.

The second pivoting point, the third pivoting point and the fourth pivoting point may be located between the first horizontal plane and the sixth horizontal plane such that, in the secondary pivoting fitting folded position, the fifth pivoting point is located between the fourth horizontal plane and the sixth horizontal plane, such that, in the lateral pivoting fitting closed position, the third pivoting point may be located between the second horizontal plane and the sixth horizontal plane, while in the lateral pivoting fitting open position, the third pivoting point may be located between the first horizontal plane and the second horizontal plane.

It can be seen that the mechanism of the present invention satisfactorily solves the problems of the hatches of the current state-of-the-art identified hereinabove by means of a simple, reliable, flexible arrangement of elements as far as their kinematics are concerned.

BRIEF DESCRIPTION OF THE DRAWINGS

In following, embodiments of the invention will be described on the basis of some drawings in which.

In these figures, the following references are used to identify the elements depicted, namely:
- 1 exterior lateral closing panel
- 1a additional exterior lateral closing panel
- 2 access opening
- 2a first lateral area
- 2b first strip
- 2c second lateral area
- 2d second strip
- 3 interior space
- 4 exterior secondary closing panel
- 4a additional exterior secondary closing panel
- 5 lateral pivoting fitting
- 5a additional lateral pivoting fitting
- 6 lateral means of articulation
- 6a additional lateral means of articulation
- 7 first fixed structure
- 7a second fixed structure
- 8 secondary pivoting fitting
- 8a additional secondary pivoting fitting
- 9 intermediate means of articulation
- 9a additional intermediate means of articulation
- 10 lateral actuating cylinder
- 10a additional lateral actuating cylinder
- 10' first end of the lateral actuating cylinder
- 10a' first end of the additional lateral actuating cylinder
- 10" second end of the lateral actuating cylinder
- 10a" second end of the additional lateral actuating cylinder
- 11 first lateral point of articulation
- 12 intermediate point of articulation
- 12a additional intermediate point of articulation
- 13 intermediate actuating cylinder
- 13' first end of the intermediate actuating cylinder
- 13a first end of the additional intermediate actuating cylinder
- 13" second end of the intermediate actuating cylinder
- 13a" second end of the additional intermediate actuating cylinder
- 14 first coupling point
- 14a first additional coupling point
- 15 second coupling point
- 15a second additional coupling point
- 16 passing moving element
- 17 landing gear

EMBODIMENTS OF THE INVENTION

Figure 1:
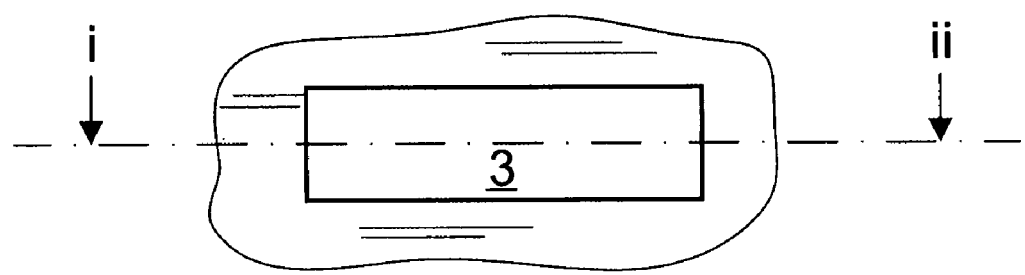
FIG. 1 is a partial bottom plan diagram view of the central front section of an aircraft with the access opening to the central landing gear well.
Figure 2:
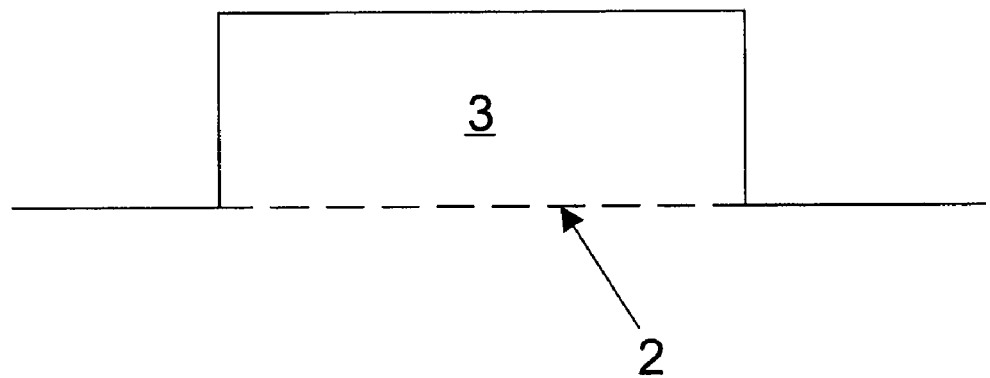
FIG. 2 is a lateral cross-sectional view along the i-ii line shown on FIG. 1.
Figure 3:
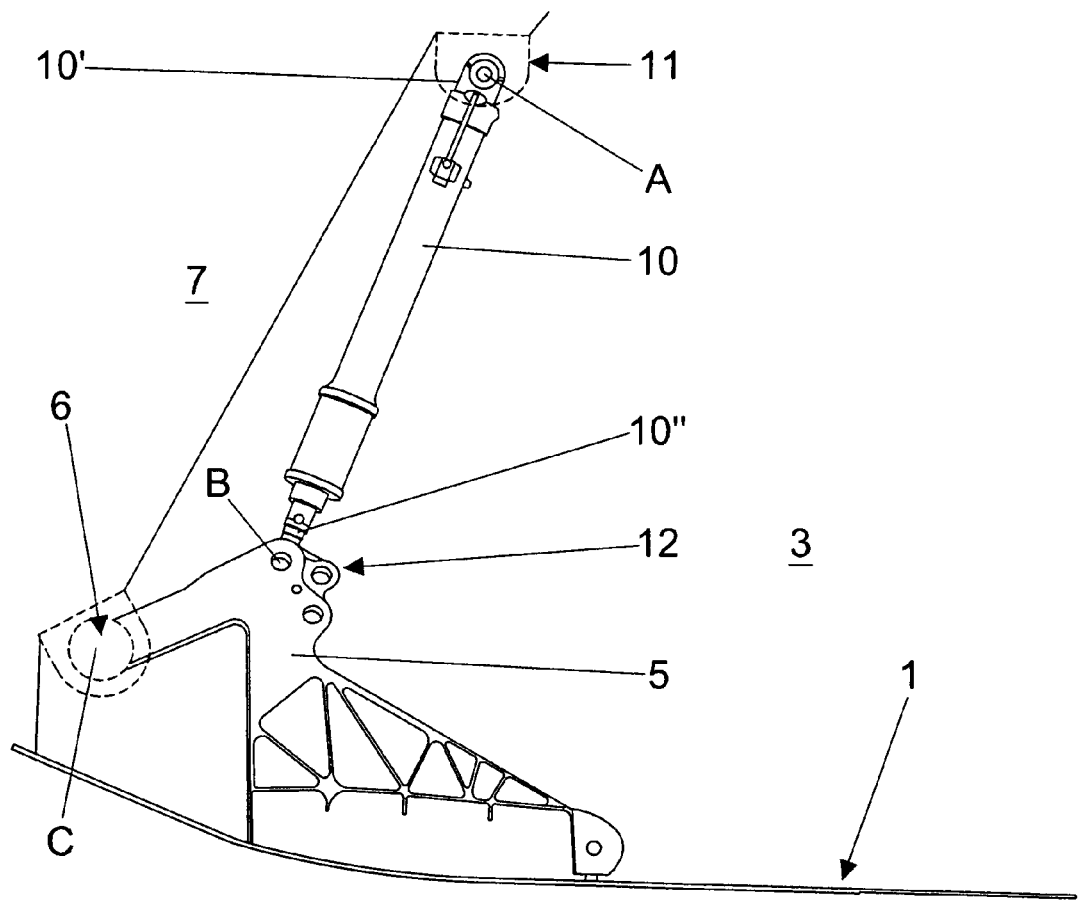
FIG. 3 is a side view of a conventional central aircraft landing gear hatch-actuating mechanism.
Figure 4:
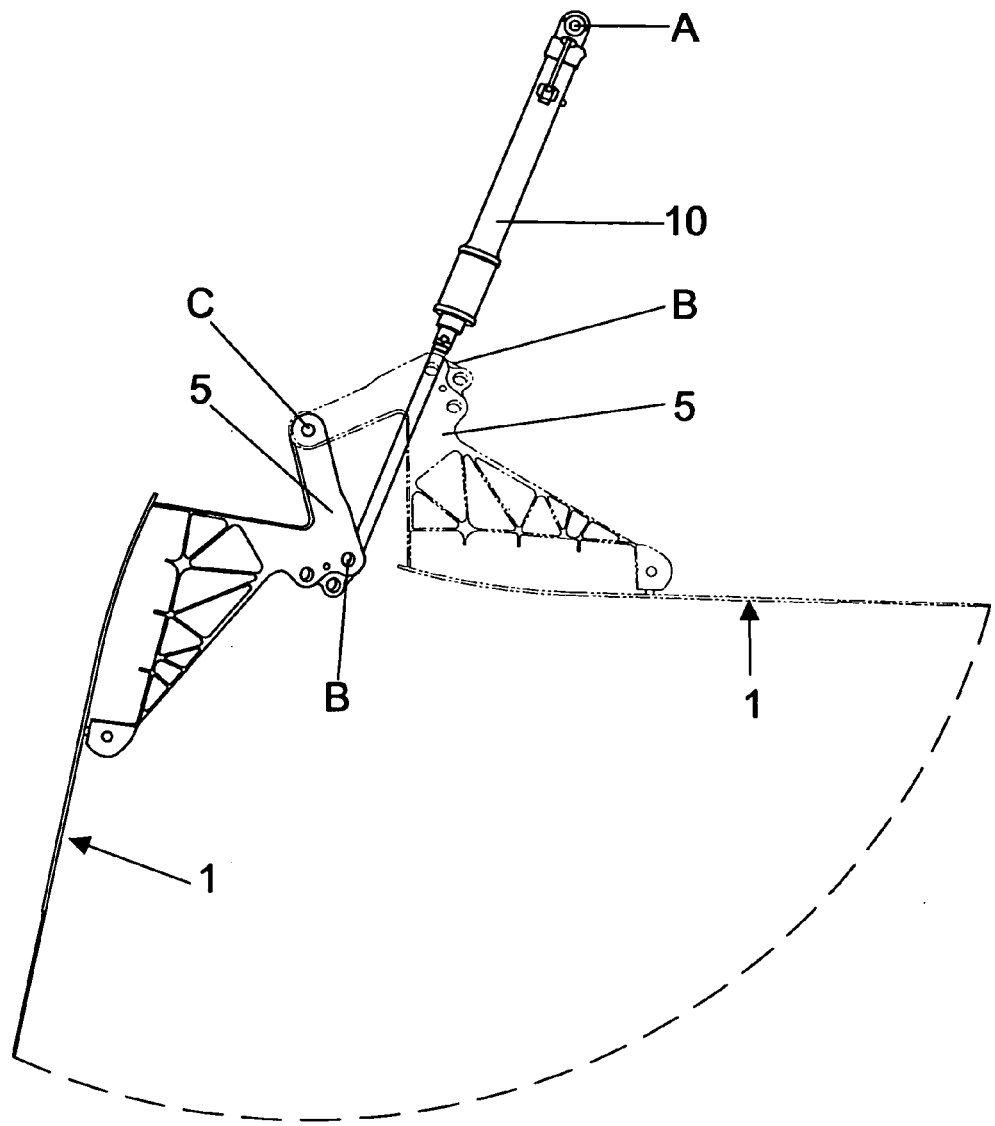
FIG. 4 is a side view of the conventional mechanism of FIG. 3 with the hatch in open and closed position.

FIGS. 1 and 2 show the access opening 2 to an interior space corresponding to the well 3 which houses the central landing gear (not shown in FIGS. 1 and 2) of an aircraft. FIGS. 3 and 4 show a conventional mechanism for closing the access opening 2, which comprises an exterior lateral closing panel 1 dimensioned for covering the access opening 2. The lateral panel 1 is jointed to a lateral pivoting fitting 5 which is coupled by way of lateral means of articulation in the form of a hinge 6 to a first fixed structure 7 at a first pivoting point A, which is located to the side of the well 3. The mechanism also consists of a lateral actuating cylinder, hydraulic or pneumatic, 10 coupled by its first end part 10' by way of a first lateral articulation point 11 on the first fixed structure 7 where a second pivoting point B is therefore defined, and by its second end part 10" to an articulation point 12, also in the form of a hinge on the lateral pivoting fitting 5. The hinge 12 defines a third pivoting point C.

As is shown in FIG. 4, the actuation of the lateral actuating cylinder 10 makes it possible to tilt the lateral pivoting fitting 5 with the lateral panel 1 from a closed position in which the lateral panel 1 covers the access opening 2, and an open position in which the lateral panel 1 does not cover the access opening 2. As shown, the free edge of the lateral panel 1 pivots on the pivoting point C such that this free edge requires an envelope which, in the vertical position of the closing panel 1 goes even past the width of the panel 1, which is a disadvantage for the reasons previously stated hereinabove.

Figure 5A:
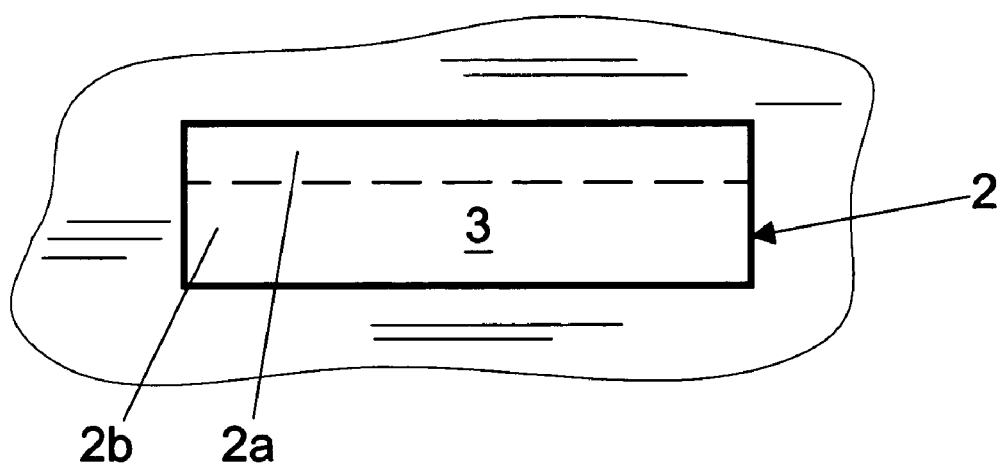
FIG. 5A is a partial bottom plan diagram view of the central front section of an aircraft with the access opening to the central landing gear well, to which a first embodiment of the actuating mechanism of the present invention is applied.
Figure 5B:
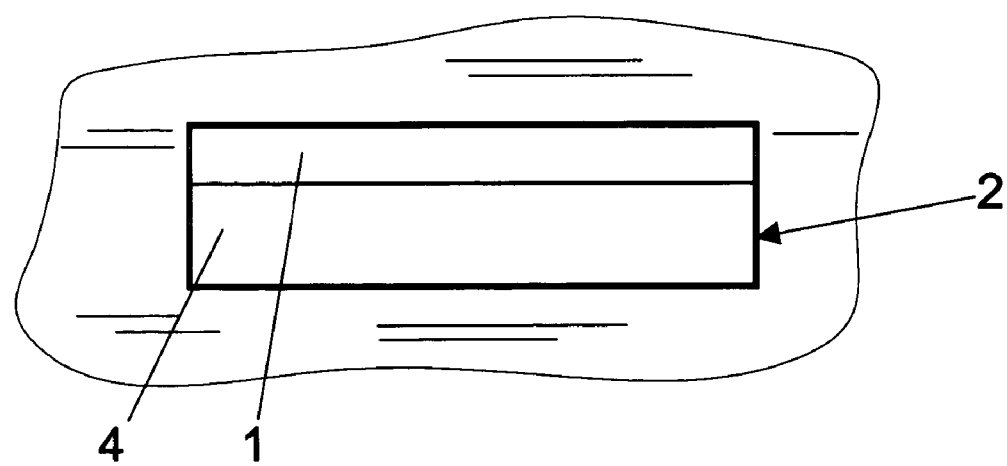
FIG. 5B is a partial bottom plan view of the exterior part of a hatch corresponding to the first embodiment of the present invention.
Figure 6:
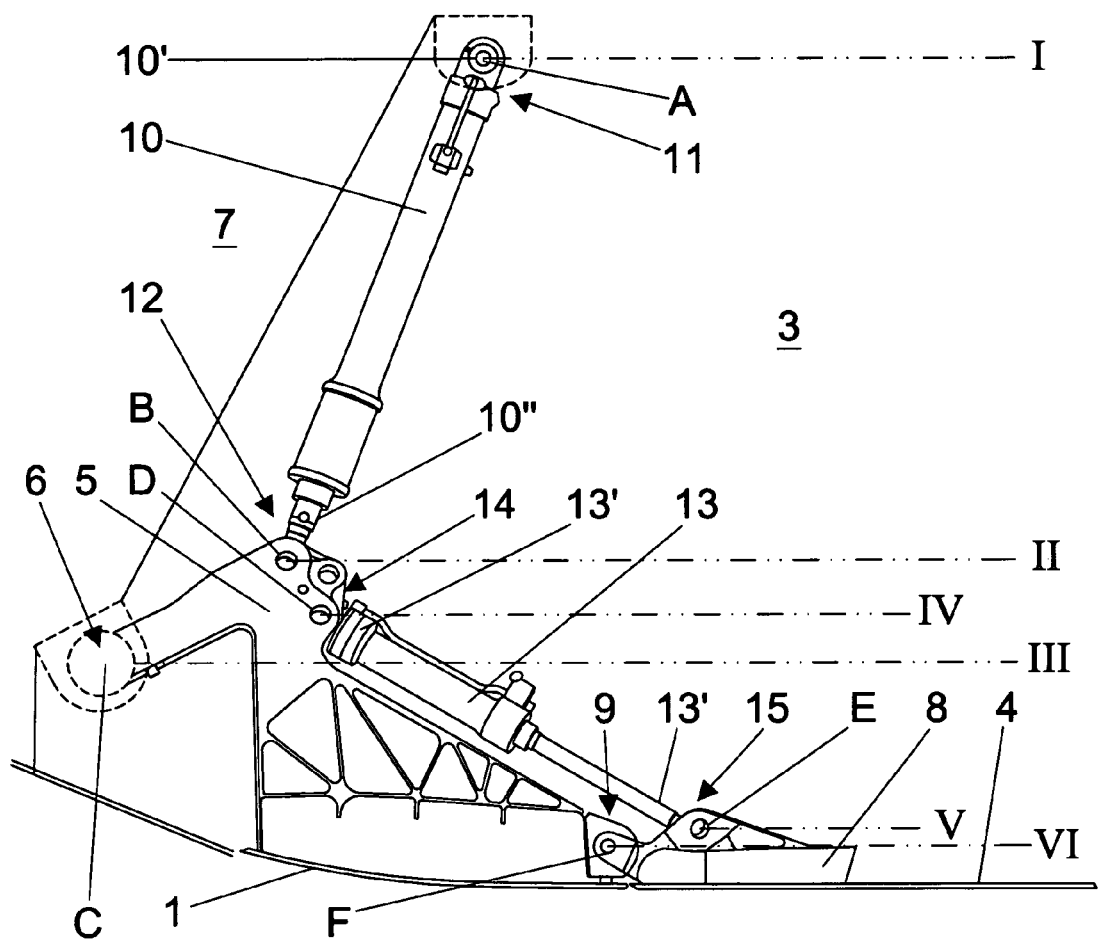
FIG. 6 is a side view of a central aircraft landing gear hatch-actuating mechanism according to the embodiment of FIG. 5B in closed position.

FIG. 5A, FIG. 5B and FIGS. 6 through 11 illustrate a first embodiment of the invention which provides a solution to the drawbacks of the conventional mechanism shown in FIGS. 3 and 4. Thus, as is shown in FIG. 5, FIG. 5A and FIG. 6, the mechanism of this first embodiment comprises a an exterior lateral closing panel 1, which, in hatch-closed position, covers a first lateral area 2a of the access opening 2, leaving a first strip 2b neighboring the aforesaid first lateral area 2a free. A secondary exterior closing panel 4 is designed for covering the strip 2b in the hatch closed position.

The mechanism illustrated in FIG. 6 comprises the lateral pivoting fitting 5, the hinge 6, the actuating cylinder 10 and the hinge 12 previously described hereinabove in relation to FIG. 3. In addition to these elements, the mechanism also comprises a secondary closing panel 4 which constitutes, in the position shown in FIG. 6, a coaxial prolongation of the lateral panel 1, and a secondary pivoting fitting 8 to which the secondary panel 4 is joined at the bottom. The lateral pivoting fitting 5 is coupled to the secondary pivoting fitting 8 by way of intermediate means of articulation 9, also in the form of a hinge. A likewise intermediate actuating cylinder 13, either hydraulic or pneumatic, is coupled by its first end part 13' to a first coupling point 14 located in a position between the lateral means of articulation 6 and the intermediate means of articulation 9 on the first lateral pivoting fitting 5, while its second end part 13" is coupled to a second coupling point 15 on the secondary pivoting fitting 8. The intermediate actuating cylinder 13 is actuatable independently from the lateral actuating cylinder 10, such that its actuation makes it possible to tilt the secondary pivoting fitting 8 with the secondary panel 4 from a folded position in which they are tilted toward the lateral pivoting fitting 5 and the secondary panel 4 does not cover the first strip 2b, and an unfolded position in which they are tilted in the direction opposite to the lateral pivoting fitting 5, so that, when the lateral panel 1 is in the closed position, the secondary panel 4 forms a joint external surface with the lateral panel 1 and covers the first strip 2b at least partially. As shown, the second coupling point 15, the first coupling point 14 and the intermediate means of articulation respectively form a fourth pivoting point D, a fifth pivoting point E and a sixth pivoting point F. Therefore, each lateral actuating cylinder 10 is articulated to the fixed structure 7 at the first pivoting point A, which is located on a first horizontal plane I, and to the lateral fitting 5 at the second pivoting point B which is located on a second horizontal plane II. In turn, the lateral fitting 5 is articulated to the fixed structure 7 at the third pivoting point C located on a third horizontal plane III, while the intermediate actuating cylinder 13 is articulated to the lateral fitting 5 at the fourth point D situated on a fourth horizontal plane IV, and to the secondary fitting 8 at the fifth pivoting point E situated on a fifth horizontal plane V, and the secondary fitting 8 is articulated to the lateral fitting 5 at the sixth pivoting point F which is situated on a sixth horizontal plane VI. In the closing position shown in FIG. 6, in which the actuating cylinder 10 is shown with its piston retracted, and the actuating cylinder 13 has its piston extended, the second pivoting point B, the third pivoting point C and the fourth pivoting point D are situated between the first horizontal plane I and the sixth horizontal plane VI. Likewise, the third pivoting point C is located between the second horizontal plane II and the sixth horizontal plane VI.

One way in which this mechanism functions at the unfolding of a landing gear from the well 3 of an aircraft is shown in FIGS. 6 through 11.

Figure 7:
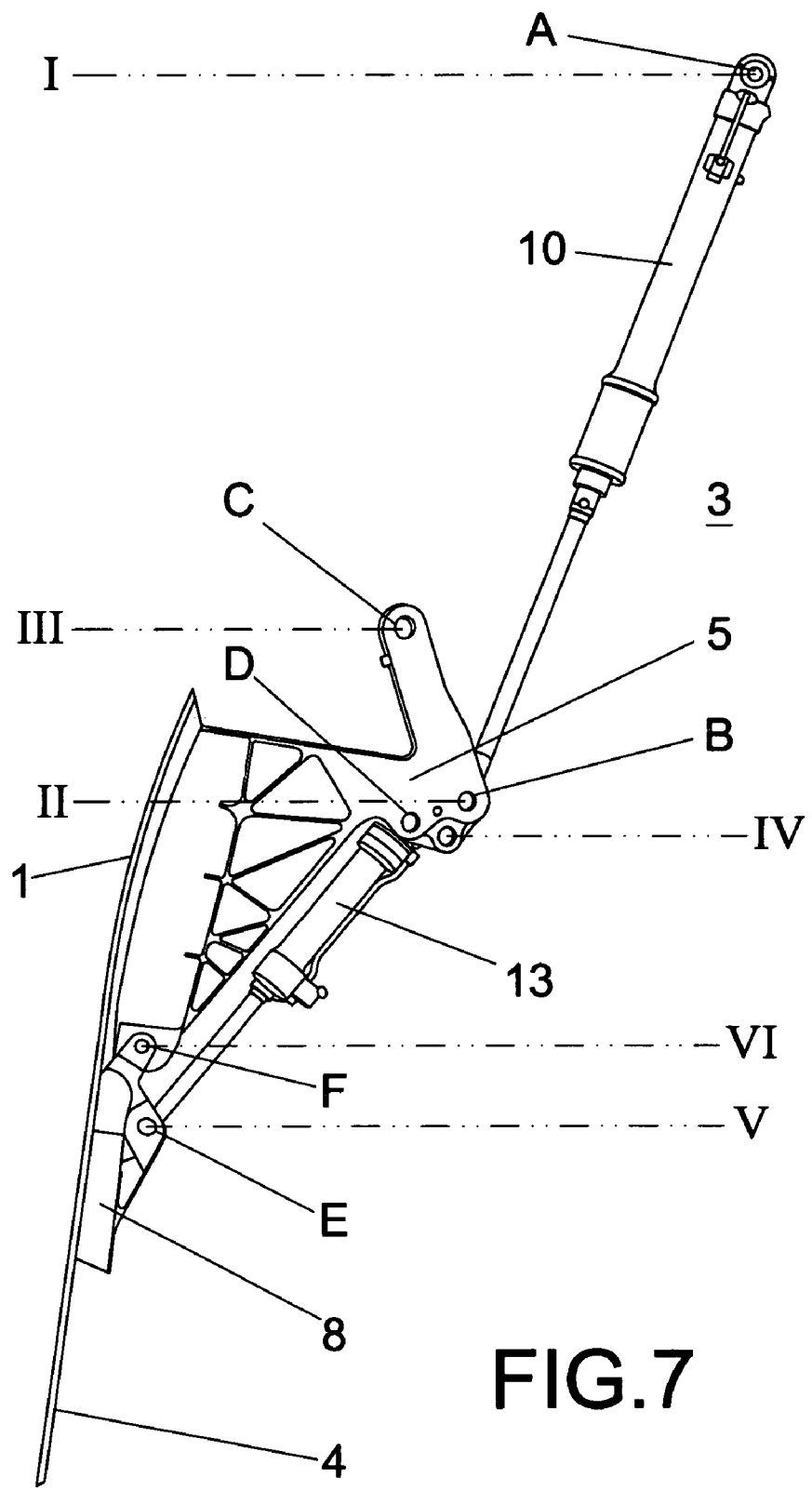
FIG. 7 shows the mechanism shown in FIG. 6 in completely open position.

Thus, when the cylinders 10, 13 are actuated, they make the panels 1, 4 move from the closed position shown in FIG. 6 to the substantially vertical position and slightly slanted outward past the edge of the access opening to the well 3, shown in FIG. 7, in which the third pivoting point C is situated between the first horizontal plane I and the second horizontal plane II and the sixth pivoting point F is situated between the fourth horizontal plane IV and the fifth horizontal plane V. In the position shown in FIG. 7, the landing gear can lower from inside the well 3, given that the access opening 2 (FIGS. 5A, 5B) is completely free, allowing the landing gear to move through.

Figure 8:
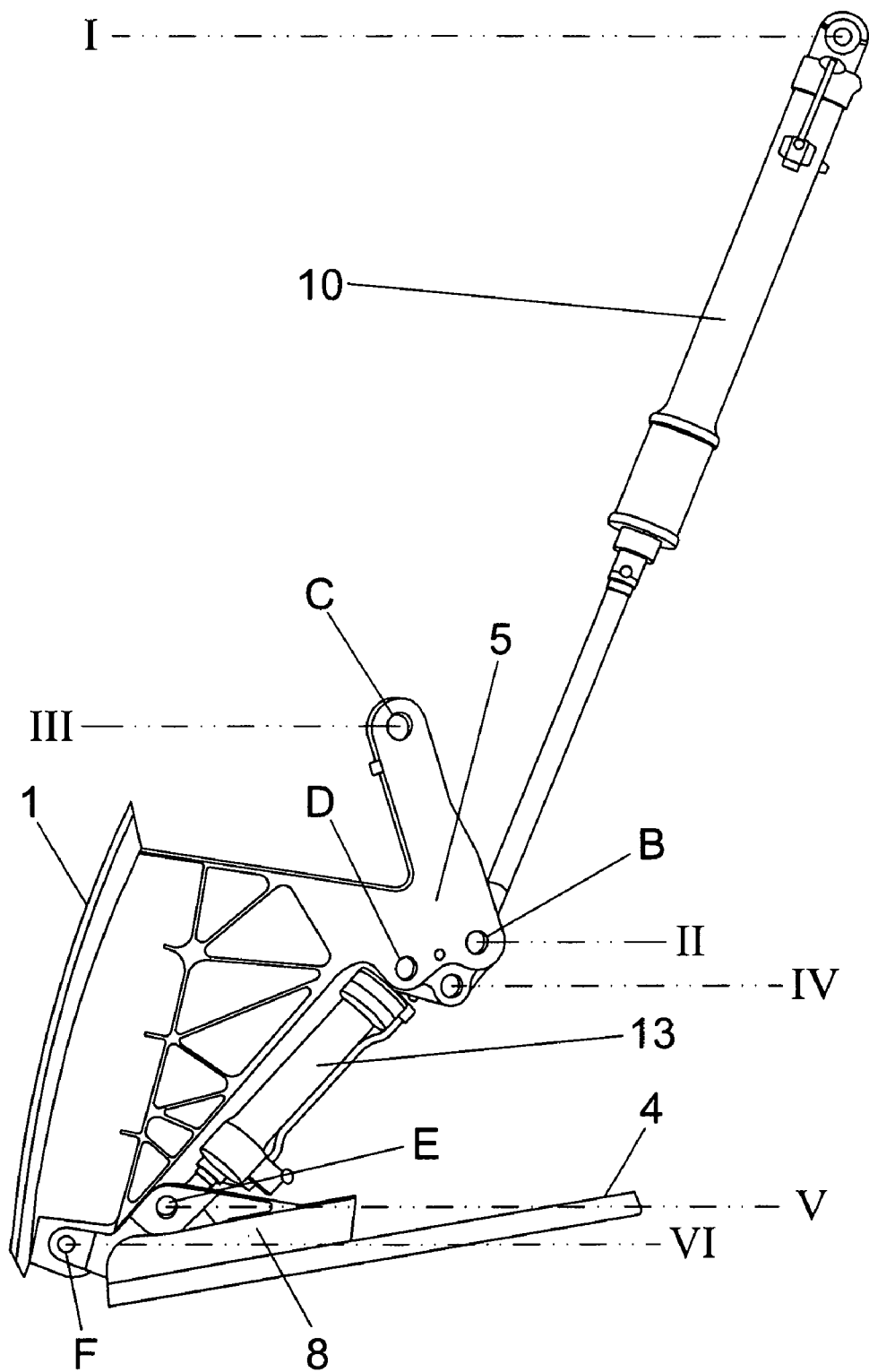
FIG. 8 shows the mechanism shown in FIG. 6 in semi-folded position.

Alternatively or as a continuation to the position shown in FIG. 7, the opening of the access opening 2 to the well 3 of the landing gear may also be that which is shown in FIG. 8, in which the piston of the lateral actuating cylinder 10 has extended, tilting the lateral fitting 5 with the lateral panel 1 to a substantially vertical position, slightly slanted toward the outside of the edge of the access opening 2, while the secondary actuating cylinder 13 has its piston retracted, such that the secondary fitting 8 and therefore the secondary panel 4 are moved away from the access opening 2 to the well 3. In this position, the third pivoting point C is situated between the second horizontal plane II and the sixth horizontal plane VI, while the fifth pivoting point E is situated between the fourth horizontal plane IV and the sixth horizontal plane VI.

Figure 9:
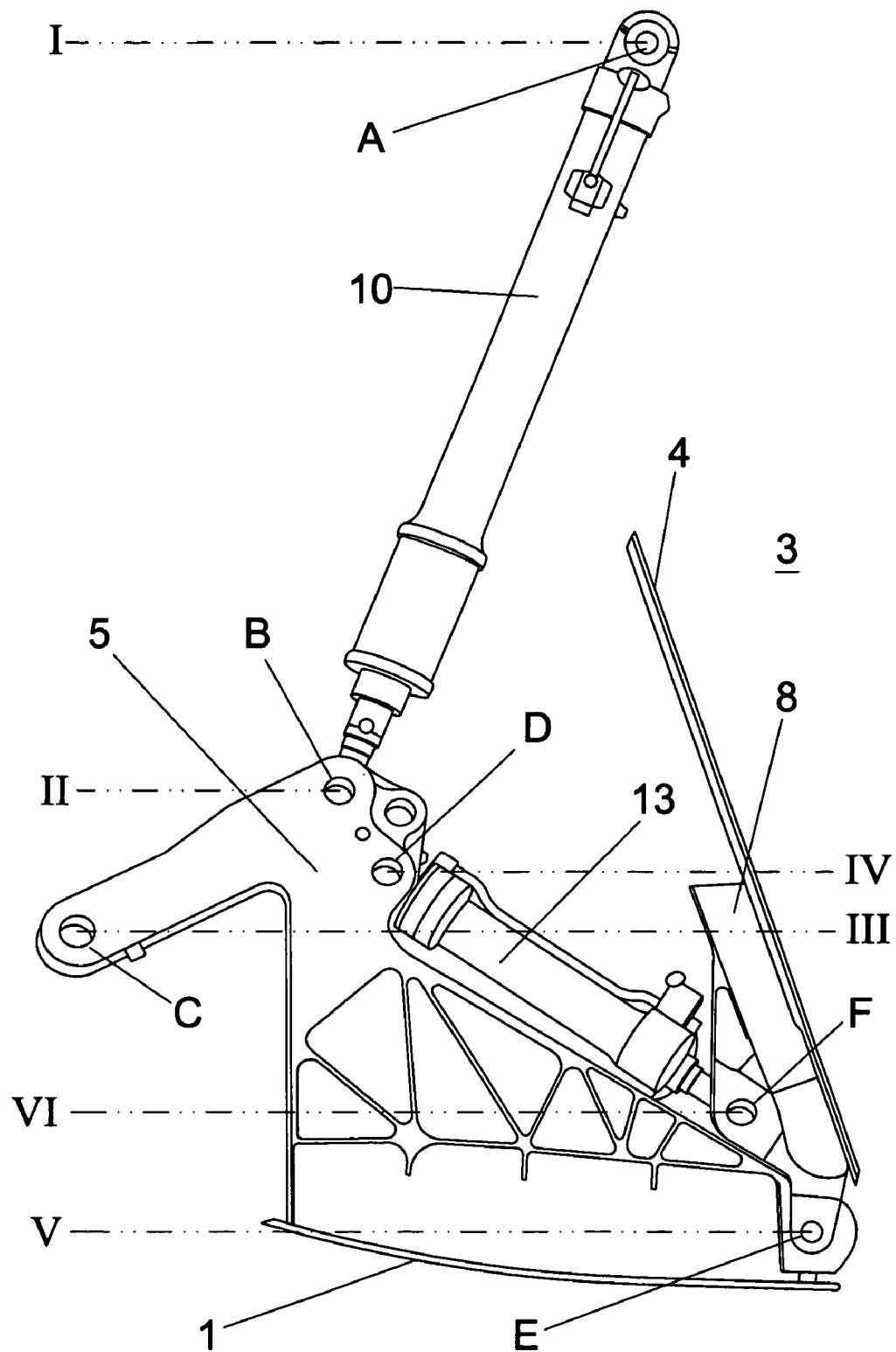
FIG. 9 shows the mechanism shown in FIG. 6 in completely folded position.
Figure 11:
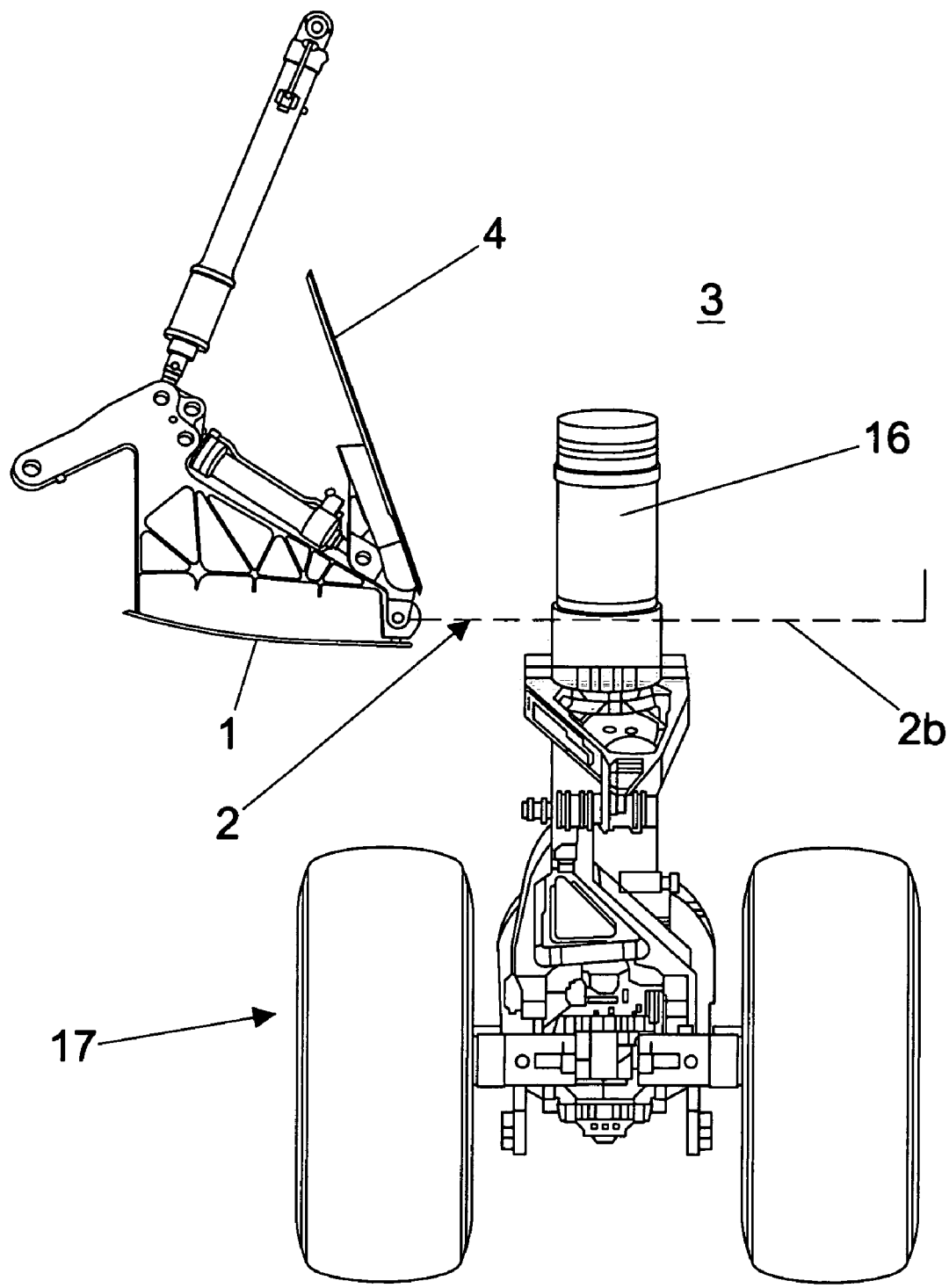
FIG. 11 shows the mechanism in the position illustrated in FIG. 9 in relation to the aircraft landing gear.

When the landing gear has dropped to its final descent position, the mechanism adopts the position shown in FIG. 9 and FIG. 11, in which the piston of the lateral actuating cylinder 10 moves back into the retracted position so that the lateral fitting 5 and the lateral panel 1 are moved back into the folded position in which the lateral panel covers lateral area 2a. In this position, the secondary fitting 8 and the secondary panel 4 remain in the folded position shown in FIG. 9, such that the strip 2b is left free of the access opening 2 through which the leg 16 of the landing gear 17 moves.

Figure 10:
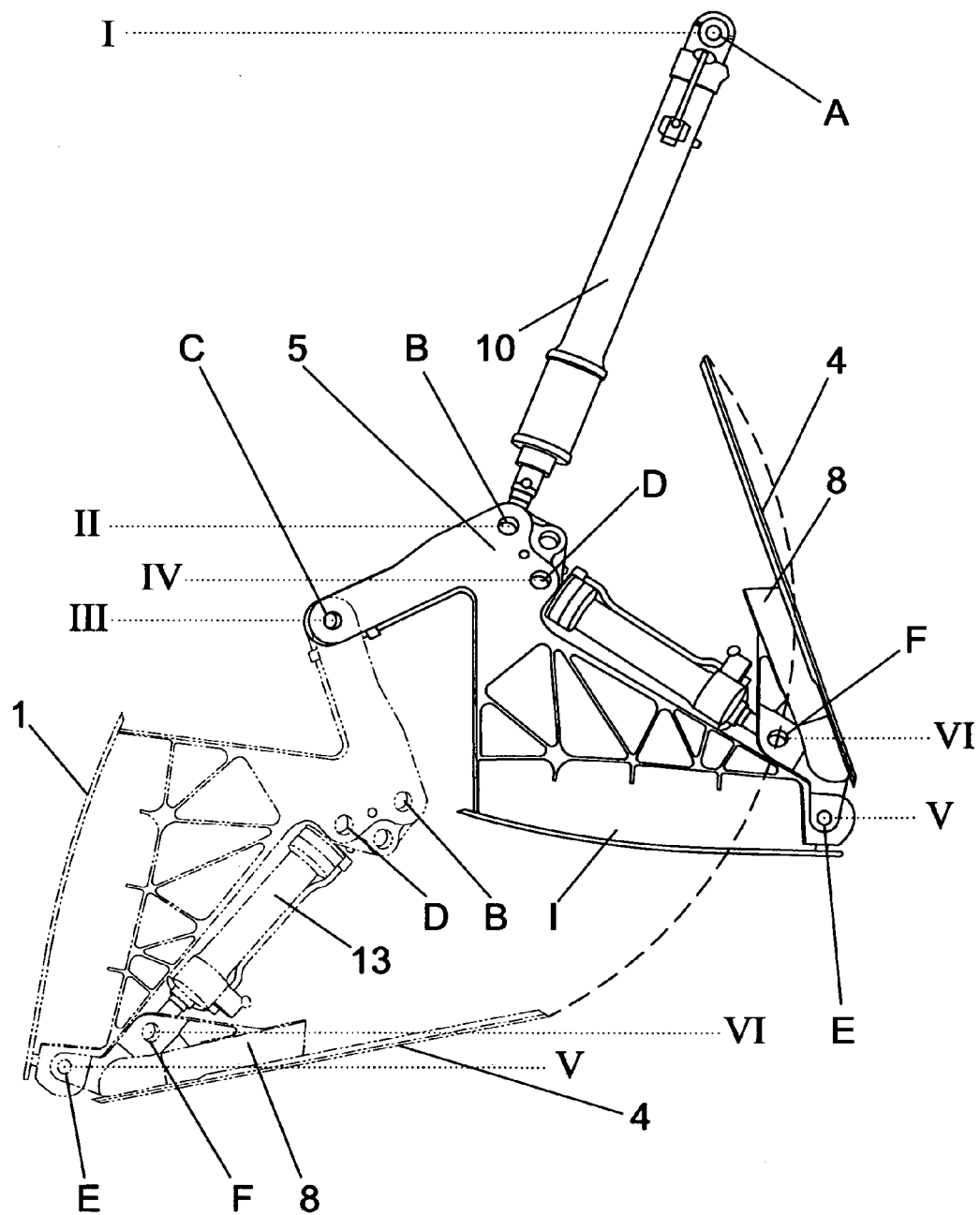
FIG. 10 shows the mechanism of FIG. 6 with the hatch in the positions shown in FIGS. 8 and 9.

According to that which is shown in FIG. 10, the turn envelope defined by the free edge of the secondary panel is substantially smaller that the turn envelope necessary for the actuation of the conventional mechanism illustrated in FIG. 3.

FIG. 12A, FIG. 12B and FIGS. 13-16 show a second embodiment of the mechanism of the present invention and the functioning thereof, in which the mechanism that moves the lateral panel 1 and the secondary panel 4 is that which is shown in FIGS. 6 through 11.

Figure 12A:
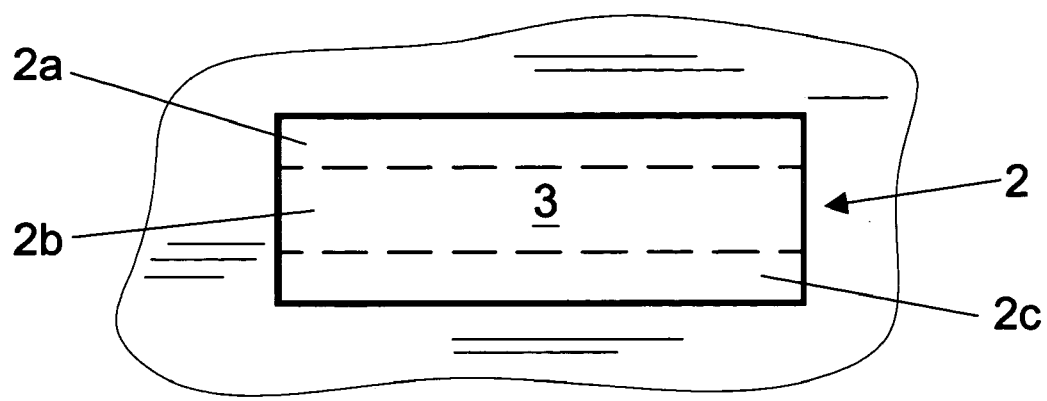
FIG. 12A is a partial bottom plan diagram view of the central front section of an aircraft with the central landing gear well access opening, at which a second embodiment of the actuating mechanism of the present invention is applied.
Figure 12B:
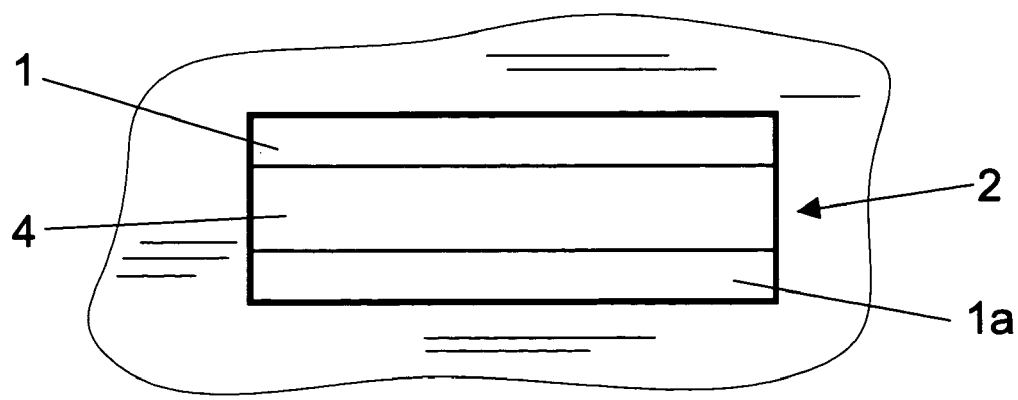
FIG. 12B is a partial bottom plan view of the exterior part of a hatch corresponding to the second embodiment of the present invention.

As shown in FIG. 12A and FIG. 12B, the mechanism of this second embodiment comprises two exterior lateral closing panels 1, 1a, which, in hatch closed position, cover the first two lateral areas 2a, 2c of the access opening 2 leaving a first strip 2b free between the aforementioned lateral areas 2a, 2c. In these figures, the additional lateral panel 1a is of substantially the same dimensions as the lateral panel 1, although in some other embodiments of the invention it may be of other different dimensions than those of the lateral panel 1.

Figure 13:
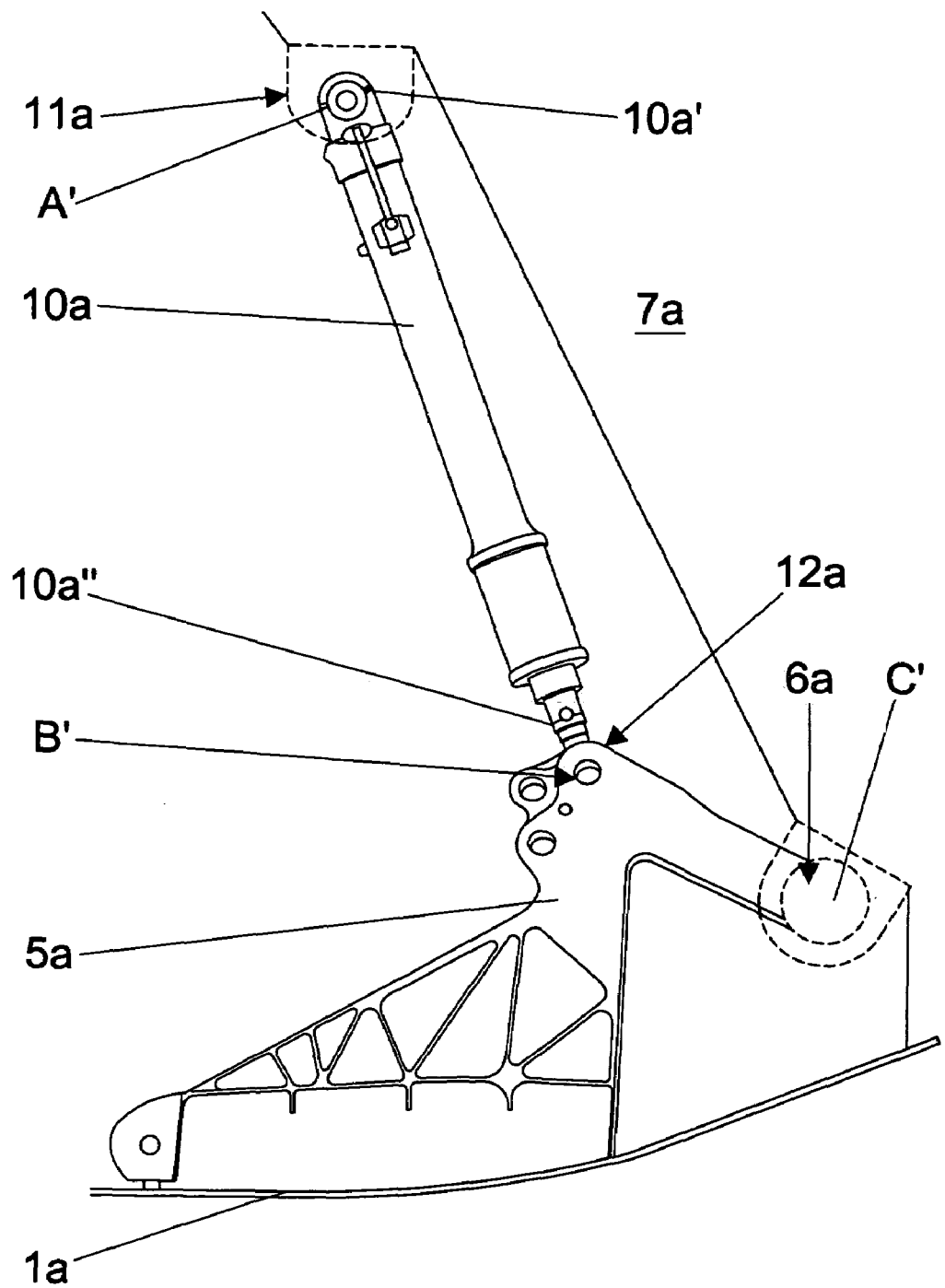
FIG. 13 is a side view of part of a central aircraft landing gear hatch actuating mechanism according to the embodiment of FIG. 12B in closed position.

FIG. 13 illustrates that the additional actuating mechanism for the additional lateral panel 1a comprises elements similar to those of the mechanism shown in FIG. 3, namely, additional lateral means of articulation in the form of a hinge 6a to which the additional lateral pivoting fitting 5a is joined, which is coupled to a second fixed structure 7a, that is located to the side of the well 3. The mechanism also consists of an additional lateral actuating cylinder 10a, hydraulic or pneumatic, coupled by its first end part 10a' by way of a first additional lateral articulation point 11a to the second fixed structure 7a, and by its second end part 10a" at an additional point of articulation 12a, also in the form of a hinge on the additional lateral pivoting fitting 5a. The actuation of the additional lateral actuating cylinder 10a makes it possible to tilt the additional lateral pivoting fitting 5a with the additional lateral panel 1a from a closed position in which the additional lateral panel 1a covers the second lateral area 2c of the access opening 2, and an open position in which the additional lateral panel 1a does not cover said second lateral area 2c. The lateral actuating cylinder 10a is articulated to the second fixed structure 7a at a first pivoting point A' which is situated on the first horizontal plane I, and to the lateral fitting 5a at a second pivoting point B' which is situated on the second horizontal plane II, while the lateral fitting 5a is articulated to the fixed structure 7a as a third pivoting point C' which is situated on the third horizontal plane III.

Figure 14:
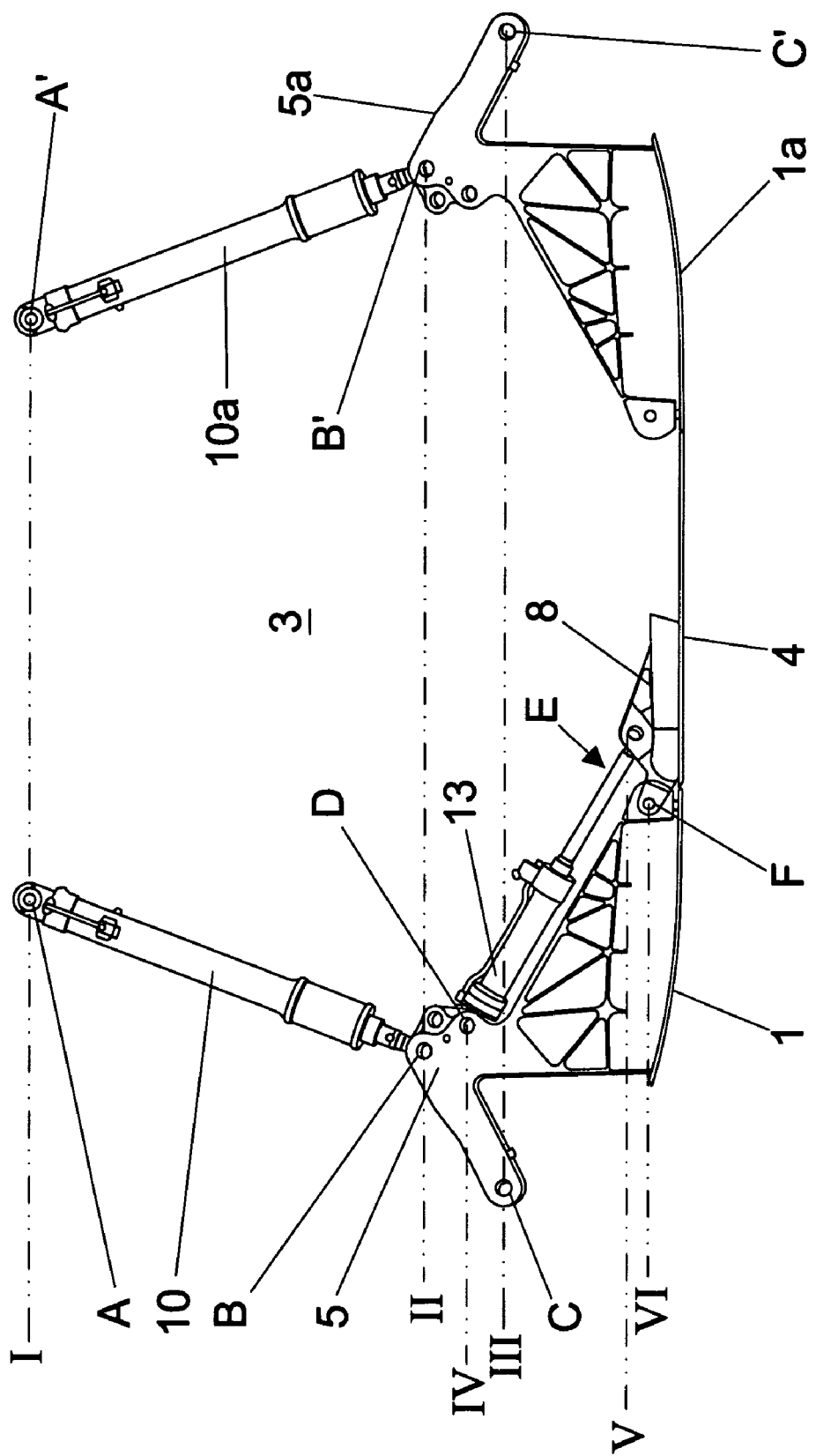
FIG. 14 is a side view of the central aircraft landing gear hatch actuating mechanism according to the embodiment of FIG. 12B in closed position, incorporating both the mechanism illustrated in FIGS. 6 through 11 and the part of the mechanism illustrated in FIG. 13.
Figure 15:
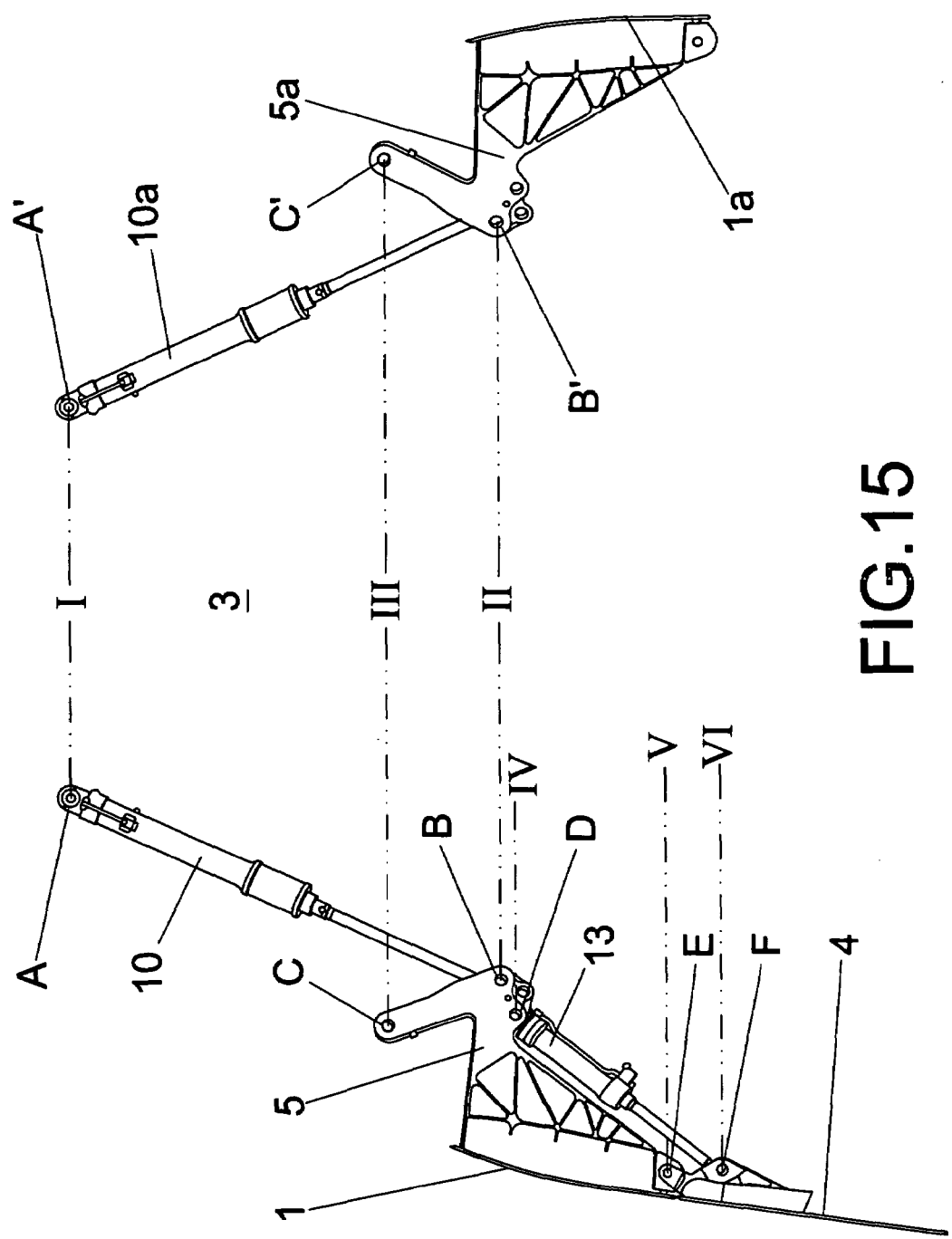
FIG. 15 shows the mechanism shown in FIG. 14 in fully open position.
Figure 16:
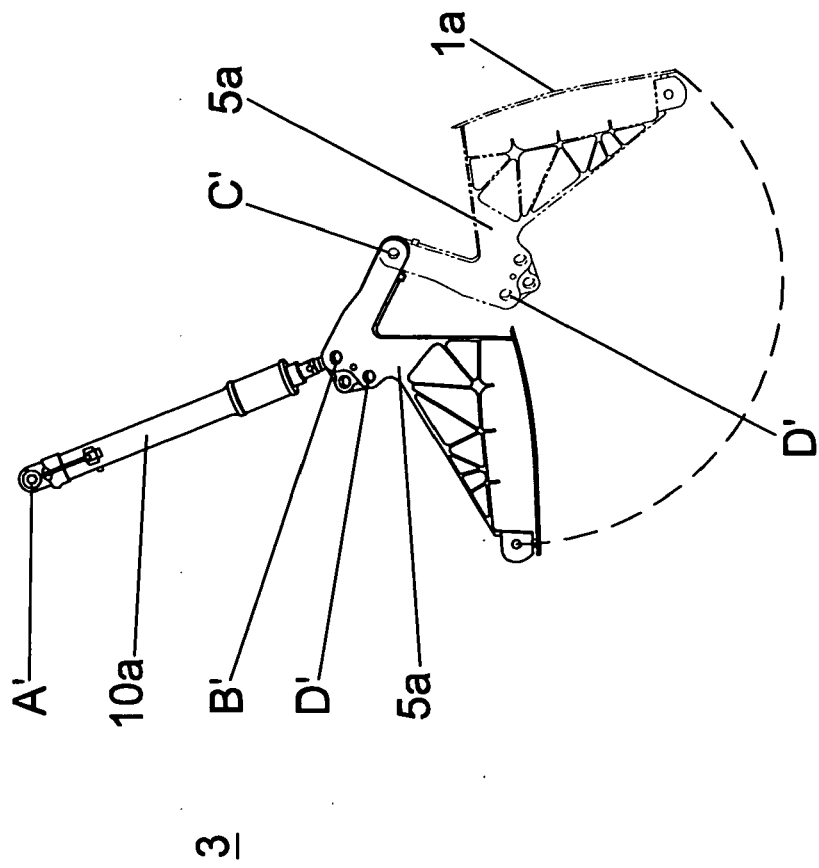
FIG. 16 shows the mechanism shown in FIG. 14 in semi-folded position and in fully folded position.
Figure 16:
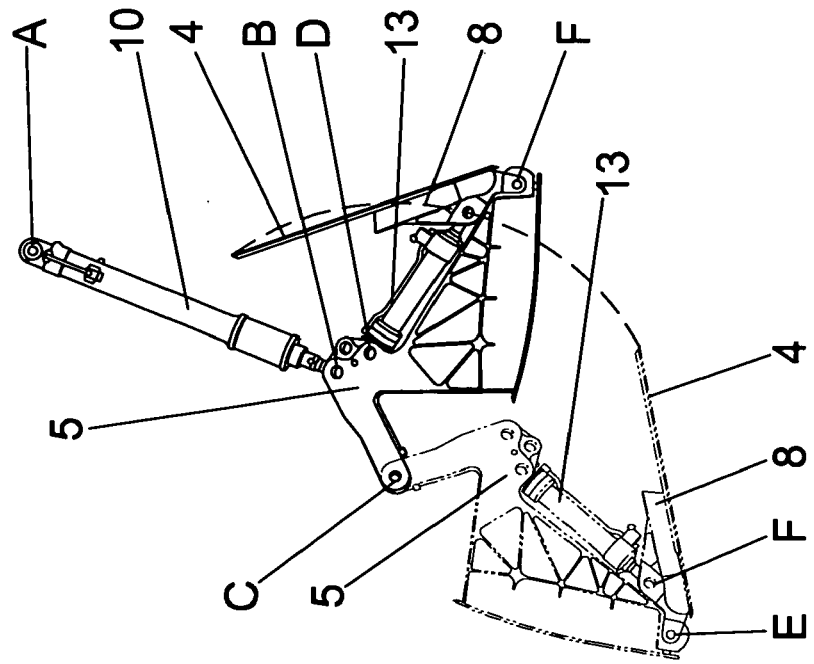

The functioning of the mechanism according to the second embodiment is illustrated in FIGS. 14 through 16, showing that the functioning of the actuating mechanism for the movement of the panels 1, 4 is similar to that of the first embodiment while that of the additional mechanism for the additional panel 1a is similar to that of the mechanism illustrated and FIG. 3 and FIG. 4. Thus, FIG. 14 shows the position of the mechanism when the hatch is completely closed, in other words, when the panels 1, 4 and 1a fully cover the access opening 2 to the well 3 of the landing gear, whilst FIG. 15 shows the mechanism in fully open position in which the panels 1, 4 and the additional lateral panel 1a are tilted toward opposite positions outside of the edge of the access opening 2 to the well 3.

FIG. 16 shows two positions of the mechanism according to the second embodiment, namely, a first position in which the lateral panel 1 and the additional panel 1a are in the same position as that illustrated in FIG. 15, and a second position, in which the additional panel 1a is in the position shown in FIG. 14, while the secondary panel is in the position shown in FIG. 9. Also in this case, the turning envelopes necessary for the turning of the free edge of the panels 1, 4 and of the additional lateral panel 1a are substantially smaller than those which would be required by a conventional mechanism comprised of two conventional mechanisms of the type which is illustrated in FIG. 3 and FIG. 4 in diametrically opposite positions.

FIG. 17A, FIG. 17B and FIGS. 18 through 21 show a third embodiment of the invention and its functioning.

Figure 17A:
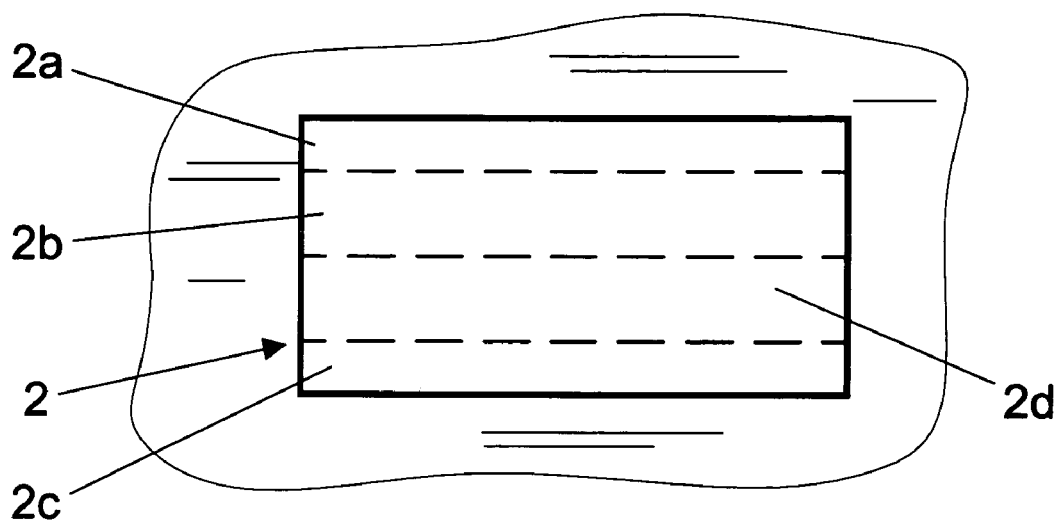
FIG. 17A, a partial bottom plan diagram view of the central front section of an aircraft with the central landing gear well access opening, to which a third embodiment of the actuating mechanism of the present invention is applied.
Figure 17B:
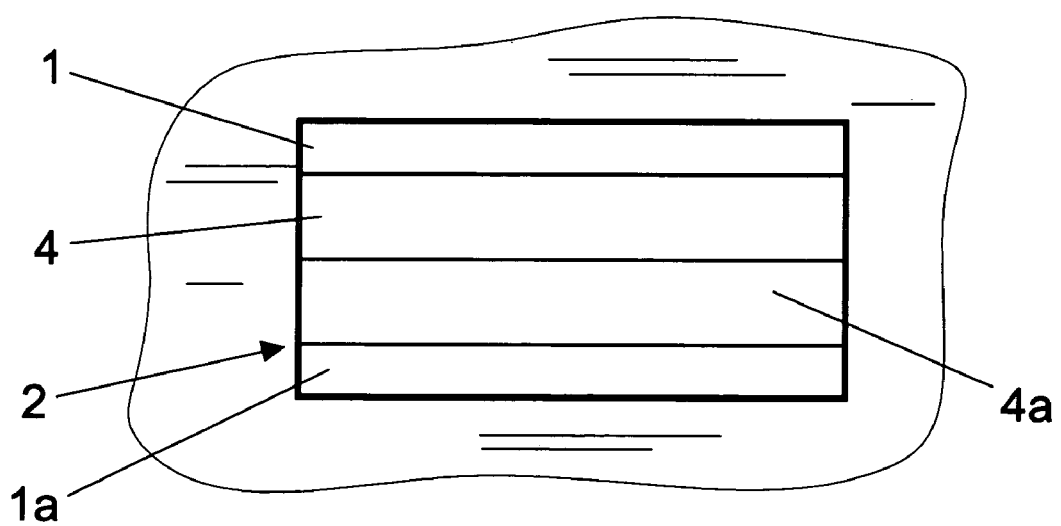
FIG. 17B is a partial bottom plan view of the exterior of a hatch corresponding to the third embodiment of the present invention.
Figure 18:
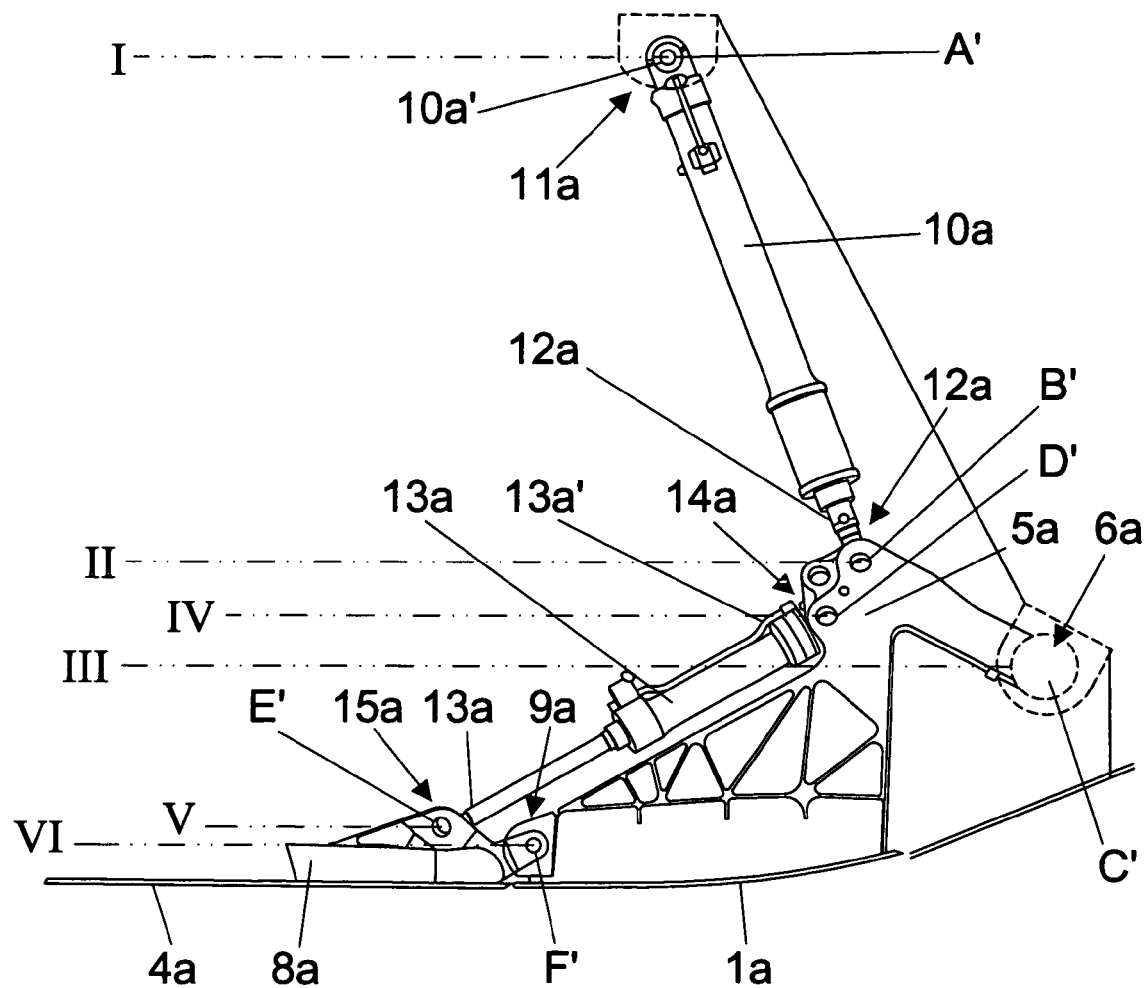
FIG. 18 is a side view of part of a central aircraft landing gear hatch actuating mechanism according to the embodiment of FIG. 12B in closed position.
Figure 19:
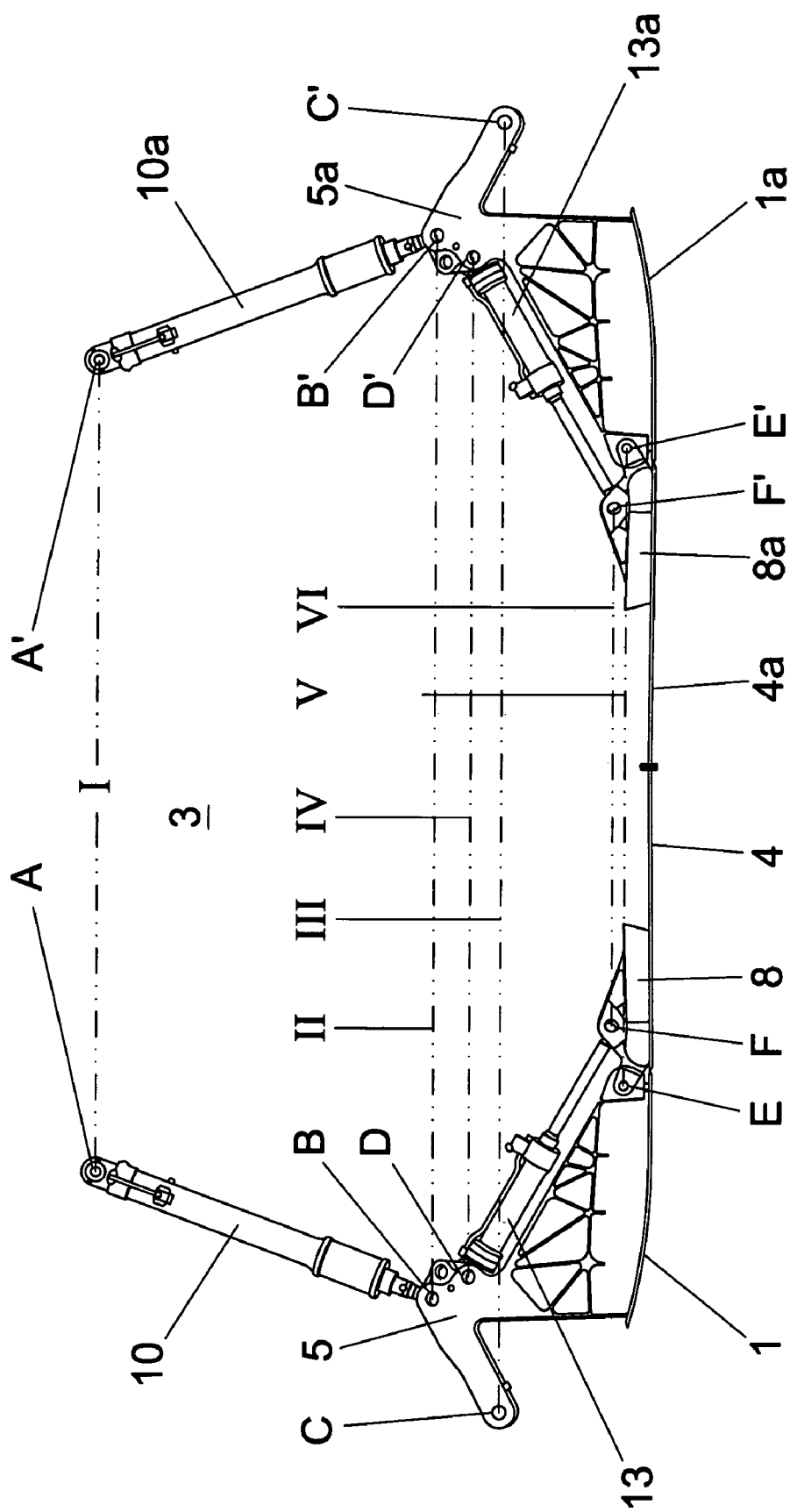
FIG. 19 is a side view of the central aircraft landing gear hatch-actuating mechanism according to the embodiment of FIG. 17B in closed position and incorporates both the mechanism illustrated in FIGS. 6 through 11 and the part of the mechanism illustrated in FIG. 18.
Figure 20:
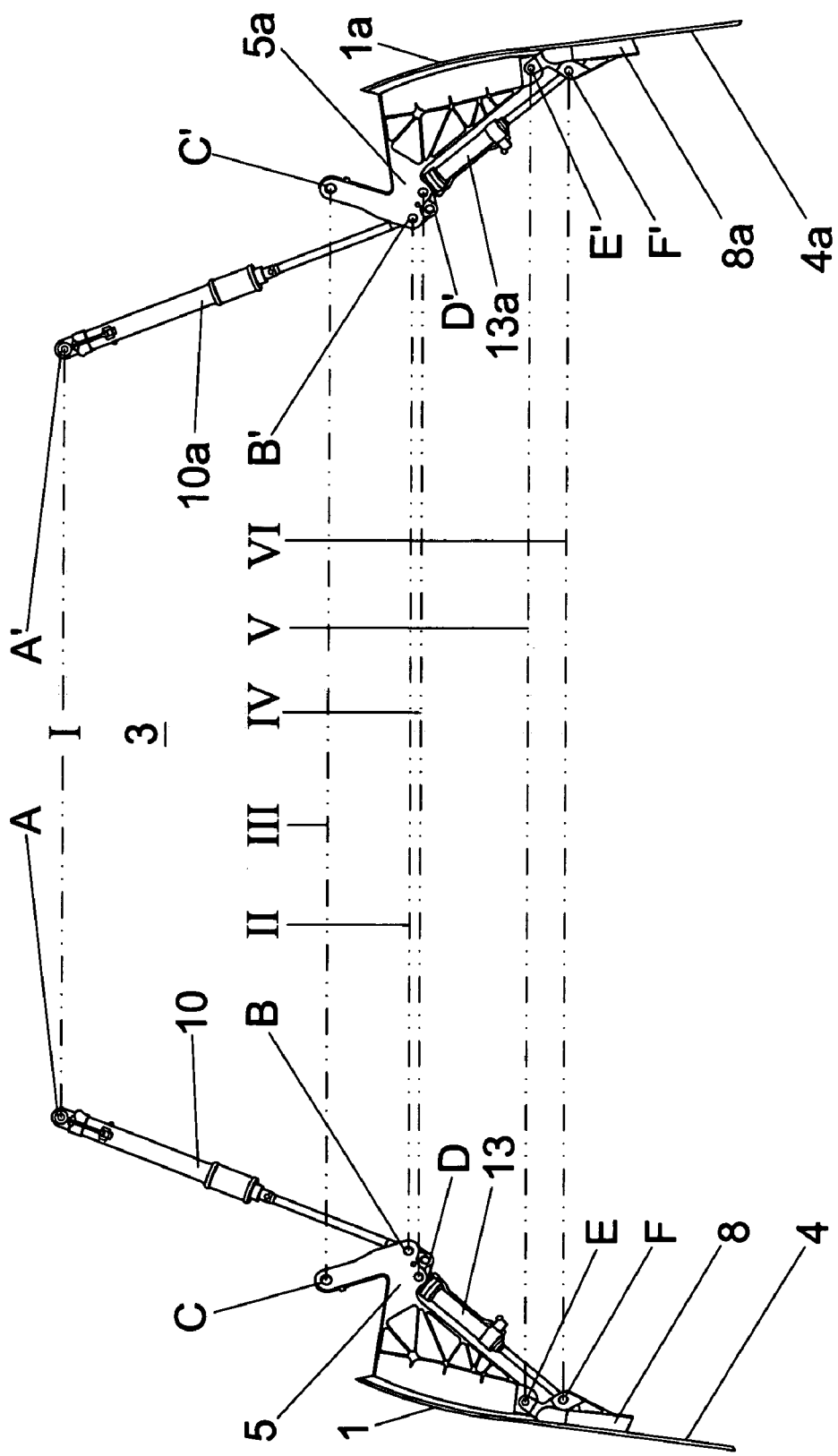
FIG. 20 shows the mechanism shown in FIG. 19 in fully open position.
Figure 21:
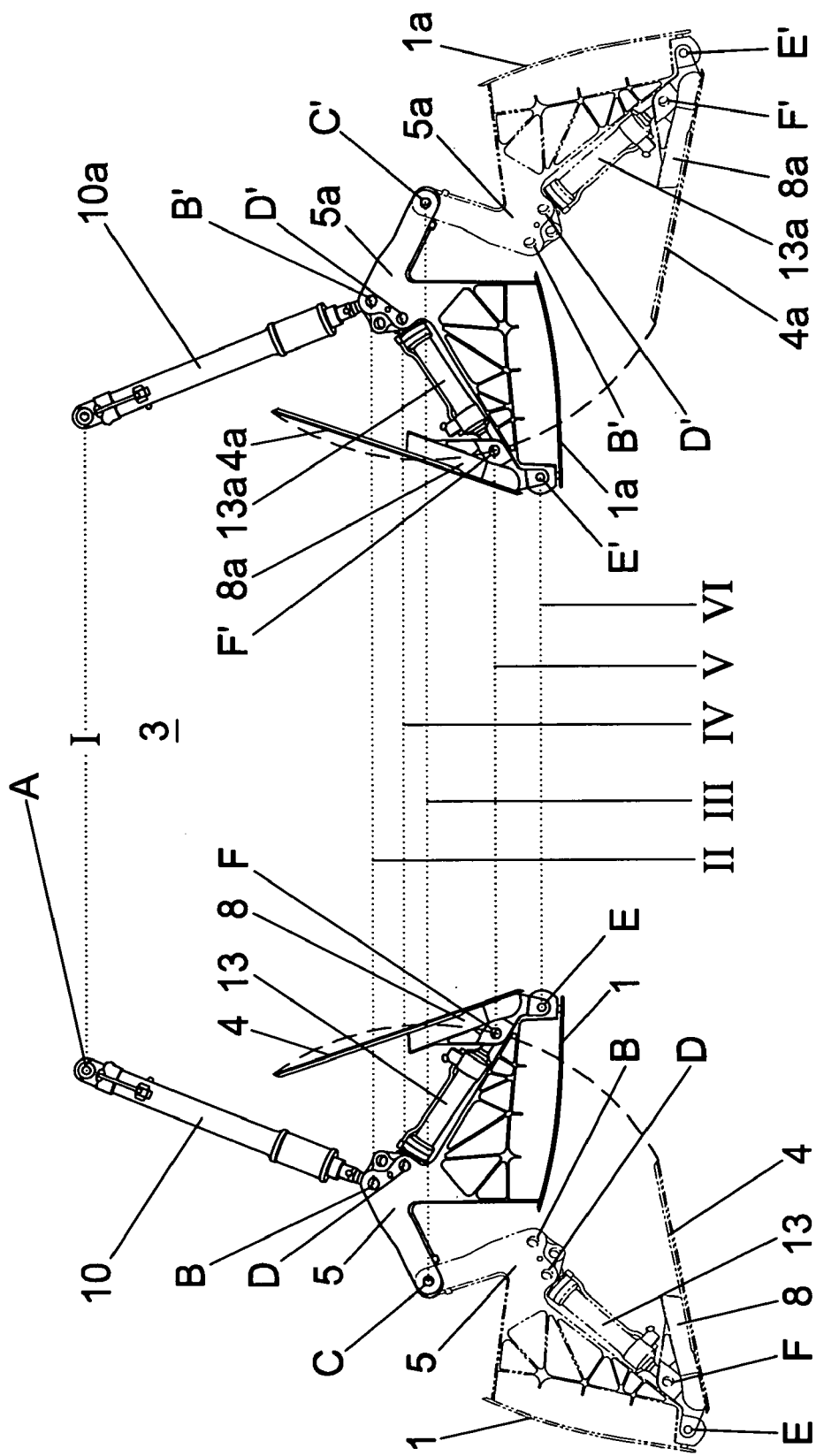
FIG. 21 shows the mechanism shown in FIG. 19 in semi-folded position and in fully-folded position.

FIG. 17A and FIG. 17B show the mechanism of this second embodiment as comprising two exterior lateral closing panels 1, 1a which, in hatch closed position, cover the first lateral area 2a, 2c of the access opening 2 leaving free the strips 2b and 2d between the aforementioned lateral areas 2a, 2c. In these figures, the additional lateral panel 1a is substantially of the same dimensions as the lateral panel 1, whilst the additional secondary panel 2d is substantially of the same dimensions as the secondary panel 2b. However, the dimensions of the panels may vary depending upon the specific design of the hatch in question.

Also in this third embodiment, there are two opposite actuating mechanisms, namely, a first mechanism corresponding to that which is illustrated in FIGS. 6 through 11, and a second actuating mechanism, configured as a mirror image of the first mechanism, intended for moving the additional lateral panel 1a and the additional secondary panel 4a. This second actuating mechanism additionally comprises the elements of the additional mechanism shown in FIG. 13, the secondary closing panel 4a which constitutes, in the position shown in FIG. 18 and FIG. 19, a coaxial prolongation of the lateral panel 1 and of the secondary panel 4, and an additional secondary pivoting fitting 8a to which the additional secondary panel 4a is attached at the bottom. The additional lateral pivoting fitting 5a is coupled to the additional secondary pivoting fitting 8a by way of additional intermediate means of articulation 9a, also in the form of a hinge. A likewise additional intermediate actuating cylinder 13a, hydraulic or pneumatic, is coupled by its first end part 13a' to a first additional coupling point 14a arranged in a position between the additional lateral means of articulation 6a and the additional intermediate means of articulation 9a on the first additional lateral pivoting fitting 5a, while its second end part 13a" is coupled to a second additional coupling point 15a on the additional secondary pivoting fitting 8a. The additional intermediate actuating cylinder 13a is actuatable independently from the additional lateral actuating cylinder 10a, such that its actuation makes it possible to tilt the additional secondary pivoting fitting 8a with the additional secondary panel 4a from a folded position in which they are tilted toward the additional lateral pivoting fitting 5a and the additional secondary panel 4a does not cover the additional strip 2d, and a unfolded position in which they are tilted in the opposite direction to the additional lateral pivoting fitting 5a, so that, when the additional lateral panel 1a is in the closed position, the additional secondary panel 4a forms a joint external surface with the additional lateral panel 1a and covers the additional strip 2d at least partially. It is shown that the second additional coupling point 15a, the first additional coupling point 14a and the additional intermediate means of articulation respectively form a fourth pivoting point D', a fifth pivoting point E' and a sixth pivoting point F'. Therefore, each additional lateral actuating cylinder 10a is articulated to the second fixed structure 7a on the first pivoting point A' which is situated on a first horizontal plane I, and to the additional lateral fitting 5a at the second pivoting point B' which is situated on a second horizontal plane II. In turn, the additional lateral fitting 5a is articulated to the second fixed structure 7a at the third pivoting point C' situated on a third horizontal plane III, while the additional intermediate actuating cylinder 13a is articulated to the additional lateral fitting 5a at the fourth pint D' situated on a fourth horizontal plane IV, and to the additional secondary fitting 8a on the fifth pivoting point E' situated on a fifth horizontal plane V. In addition thereto, the additional secondary fitting 8a is articulated to the additional lateral fitting 5a at the sixth pivoting point F', which is situated on a sixth horizontal plane VI. In the closed position shown in FIG. 18, in which the additional actuating cylinder 10a has its piston retracted, and the additional actuating cylinder 13a has its piston extended, the second pivoting point B', the third pivoting point C' and the fourth pivoting point D' are situated between the first horizontal plane I and the sixth horizontal plane VI. Likewise, the third pivoting point C' is situated between the second horizontal plane II and the sixth horizontal plane VI.

As is illustrated in FIGS. 18 through 21, the mechanisms which respectively move the panels 1, 4 and 1a, 4a act similarly to that of the mechanisms according to the first embodiment illustrated in FIGS. 6 through 11. Also in this case, the turn envelopes necessary for the pivoting of the free edge of the secondary panels 4 and 4a and of the lateral panels 1, 1a are substantially smaller than those which would be required for a conventional mechanism comprised of two conventional mechanisms of the type which is illustrated in FIG. 3 and FIG. 4 in diametrically opposite positions.

It is shown that the mechanism of the present invention affords the possibility of wide-ranging kinematics for the opening and the closing of the hatches and satisfactorily solves the problems inherent to the conventional mechanisms.

The invention claimed is:

1. A hatch-actuating mechanism, for an aircraft landing gear, comprising
   a lateral closing panel dimensioned to cover, in hatch-closed position, a first lateral area of an access opening to an interior space, leaving free a first strip neighboring said first lateral area;
   a secondary closing panel dimensioned to cover, in hatch-closed position, at least part of the first strip, which is not covered by the lateral panel;
   a lateral pivoting fitting rotatably connected via a first lateral articulation to a first fixed structure which is located laterally in said interior space;
   a secondary pivoting fitting to which said secondary panel is connected at the bottom;
   the secondary pivoting fitting being rotatably connected to the lateral pivoting fitting via a first intermediate articulation;
   lateral actuating means selected from the group consisting of a hydraulic actuating cylinder and a pneumatic actuating cylinder, rotatably connected by its first end part to the first fixed structure via a second lateral articulation, and rotatably connected by its second end part to the lateral pivoting fitting via a second intermediate articulation, the second intermediate articulation being arranged in a position between the first lateral articulation and the first intermediate articulation such that the actuation of said lateral actuating cylinder tilts the lateral pivoting fitting with the lateral panel from a closed position in which the lateral panel covers said first lateral area, to an open position in which said lateral panel does not cover said first lateral area;
   intermediate actuating means selected from the group consisting of a hydraulic actuating cylinder and a pneumatic actuating cylinder, rotatably connected by its first end part to the lateral pivoting fitting via a third intermediate articulation in a position between said first lateral articulation and said first intermediate articulation, and a second end part rotatably connected to the secondary pivoting fitting via a fourth intermediate articulation;

in such a manner that it is possible to keep the secondary panel in an inward folded position while the hatch is closed only by the lateral closing panel, and tilt the secondary pivoting fitting with the secondary panel from a folded position in which they are tilted toward the lateral pivoting fitting and said secondary panel does not cover said first strip, and a unfolded position in which they are tilted in a direction opposite said lateral pivoting fitting, so that, when the lateral panel is in the closed position, the secondary panel forms a joint exterior surface with said lateral panel and covers said first strip at least partially.

2. A mechanism according to claim 1, wherein it comprises an additional exterior lateral closing panel dimensioned to cover, in hatch-closed position, a second lateral area of said access opening, opposite said first lateral area and being neighboring said first strip, at least one additional lateral pivoting fitting to which said additional lateral panel is attached at the bottom, being couplable by means of additional lateral means of articulation to a second fixed structure which is located laterally in said interior space in a crosswise position opposite to the position of said first fixed structure, at least one additional lateral actuating cylinder, hydraulic or pneumatic, couplable by its first end part to a first additional lateral articulation point on the second fixed structure, and coupled by its second end part to an additional intermediate articulation point of the additional lateral pivoting fitting, the additional intermediate articulation point being arranged in a position between said additional lateral means of articulation and said additional intermediate means of articulation such that the actuation of said additional lateral actuating cylinder tilts the additional lateral pivoting fitting with the additional lateral panel from a closed position, in which the additional lateral panel covers said second lateral area, to an open position in which said additional lateral panel does not cover said second lateral area.

3. A mechanism according to claim 1, wherein it comprises an additional exterior lateral closing panel dimensioned to cover, in hatch-closed position, a second lateral area of said access opening, opposite said first lateral area, leaving free a second strip between said first strip and said second lateral area;

an additional secondary exterior closing panel dimensioned to cover, in hatch-closed position, at least part of the second strip, which is not covered by any other of the panels;

the at least one lateral pivoting fitting to which said additional lateral panel is attached at the bottom, couplable by means of additional lateral means of articulation to a second fixed structure which is located laterally in said interior space in a crosswise position opposite the position of said first fixed structure;

at least one additional secondary pivoting fitting to which said additional secondary panel is attached at the bottom;

additional intermediate means of articulation which couple the additional lateral pivoting fitting to the additional secondary pivoting fitting;

at least one additional lateral actuating cylinder, hydraulic or pneumatic, couplable by its first end part to a first additional lateral articulation point on the second fixed structure, and coupled by its second end part to an additional intermediate articulation point of the additional lateral pivoting fitting;

the additional intermediate articulation point being arranged in a position between said additional lateral means of articulation and said additional intermediate means of articulation, such that the actuation of said additional lateral actuating cylinder tilts said additional lateral pivoting fitting with the additional lateral panel from a closed position in which the additional lateral panel covers said second lateral area, and an open position in which said additional lateral panel does not cover said second lateral area;

at least one additional intermediate actuating cylinder, hydraulic or pneumatic, with a first end part coupled to a first additional coupling point arranged in a position between said additional lateral means of articulation and said additional intermediate means of articulation on the first additional lateral pivoting fitting, and a second end part coupled to a second additional coupling point on the additional secondary pivoting fitting;

the additional intermediate actuating cylinder being actuatable independently from the additional lateral actuating cylinder, such that its actuation makes it possible to tilt the additional secondary pivoting fitting with the additional secondary panel from a folded position in which they are tilted toward the additional lateral fitting and said additional secondary panel does not cover said second strip, and an unfolded position in which they are tilted in the opposite direction of said additional lateral pivoting fitting;

the additional secondary panel forming, when the additional lateral panel is in closed position, a jointed external surface with said additional lateral panel and covers said second strip at least partially;

said lateral panels and said secondary panels forming, in closed position, a cover which covers said access opening at least partially.

4. A mechanism according to claim 1, wherein each lateral actuating cylinder is articulated to its corresponding fixed structure on a first pivoting point which is situated on a first horizontal plane, and to its corresponding lateral fitting on a second pivoting point which is situated on a second horizontal plane;

each lateral fitting is articulated to its corresponding fixed structure on a third pivoting point which is situated on a third horizontal plane;

each intermediate actuating cylinder is articulated to its corresponding lateral fitting on a fourth point which is situated on a fourth horizontal plane, and to its corresponding secondary fitting on a fifth pivoting point which is situated on a fifth horizontal plane;

each secondary fitting is articulated to its corresponding lateral fitting on a sixth pivoting point which is situated on a sixth horizontal plane.

5. A mechanism according to claim 4, wherein the second pivoting point, the third pivoting point and the fourth pivoting point are situated between said first horizontal plane and said sixth horizontal plane.

6. A mechanism according to claim 4, wherein, in the position in which the secondary pivoting fitting is folded, the fifth pivoting point is situated between said fourth horizontal plane and said sixth horizontal plane.

7. A mechanism according to claim 4, wherein, in the position in which the lateral pivoting fitting is closed, the third pivoting point is situated between said second horizontal plane and said sixth horizontal plane, while in the position in which the lateral pivoting fitting is open, the third pivoting point is situated between said first horizontal plane and said second horizontal plane.

* * * * *